United States Patent
Zhang et al.

(10) Patent No.: US 12,388,254 B2
(45) Date of Patent: Aug. 12, 2025

(54) POWER SUPPLY AND DISTRIBUTION SYSTEM FOR DATA CENTER

(71) Applicant: Huawei Digital Power Technologies Co., Ltd., Shenzhen (CN)

(72) Inventors: Xiaofei Zhang, Shenzhen (CN); Peiguo Liu, Dongguan (CN); Zhuyong Huang, Dongguan (CN); Zhen Qin, Shenzhen (CN); Bifei Yang, Shenzhen (CN); Kelei Liu, Shenzhen (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/344,963

(22) Filed: Jun. 30, 2023

(65) Prior Publication Data
US 2023/0396063 A1   Dec. 7, 2023

Related U.S. Application Data

(63) Continuation of application No. PCT/CN2020/142094, filed on Dec. 31, 2020.

(51) Int. Cl.
*H02J 1/10*   (2006.01)
*H02J 3/36*   (2006.01)
*H02J 9/06*   (2006.01)

(52) U.S. Cl.
CPC .............. *H02J 1/102* (2013.01); *H02J 3/36* (2013.01); *H02J 9/061* (2013.01); *H02J 2310/16* (2020.01)

(58) Field of Classification Search
CPC ...................................................... H02J 1/102
See application file for complete search history.

(56) References Cited

U.S. PATENT DOCUMENTS

| 8,994,231 | B1 | 3/2015 | Corhodzic et al. |
| 2021/0397238 | A1* | 12/2021 | Macasero ............. G06F 11/324 |
| 2022/0269325 | A1* | 8/2022 | Huang .................... H02M 3/00 |
| 2023/0054222 | A1* | 2/2023 | Stokman ................... H02J 1/04 |

FOREIGN PATENT DOCUMENTS

CN   111384718 A   7/2020

OTHER PUBLICATIONS

Shanyuan, "The Cornerstone of Enterprise Digitalization: Alibaba Cloud Computing Infrastructure", Publishing House of Electronics Industry, Alibaba Group Technology Series, ISBN: 978-7-121-37388-6, Jan. 1, 2020, 6 pages.
Ke et al., "Green Data Center Power Supply System", Science Press, Science Publishing House, ISBN: 978-7-03-039795-9, Feb. 28, 2014, 8 pages.

* cited by examiner

*Primary Examiner* — Daniel Kessie
(74) *Attorney, Agent, or Firm* — Maier & Maier, PLLC

(57) ABSTRACT

A power supply and distribution system for a data center. The power supply and distribution system for a data center includes a plurality of SST power supply systems. Each of the plurality of SST power supply systems includes a rectifier module that performs voltage reduction and rectification by using an SST and an energy storage apparatus connected to the rectifier module. The plurality of SST power supply systems are in a one-to-one correspondence with a plurality of cabinet units, and each of the plurality of cabinet units is configured to deploy an SST power supply system corresponding to the cabinet unit. The rectifier module in each of the plurality of SST power supply systems receives electric energy through a medium-voltage bus.

17 Claims, 8 Drawing Sheets

POWER SUPPLY AND DISTRIBUTION SYSTEM FOR DATA CENTER

CROSS-REFERENCE TO RELATED APPLICATIONS

This application is a continuation of International Application No. PCT/CN2020/142094, filed on Dec. 31, 2020, the disclosure of which is hereby incorporated by reference in its entirety.

TECHNICAL FIELD

The embodiments relate to the field of power electronics technologies and to a power supply and distribution system for a data center.

BACKGROUND

A data center may be understood as a physical space that provides functions and services such as centralized processing, storage, transmission, exchange, and management for various electronic devices. Most of the electronic devices deployed in the data center are precision IT devices, such as a computer, a server, a network device, and a storage device. These IT devices impose high requirements on power supply quality, that is, require the data center to provide a continuous, stable, balanced, and safe power supply environment. However, problems such as intermittent interruption, fluctuation, and transient interruption may occur in a mains power grid or another power supply. In view of this, it is not suitable to directly provide the mains power grid or the like to the IT devices. Instead, electricity power needs to be processed by a power supply and distribution system for a data center before being distributed to the IT devices.

In a conventional technology, a type of power supply and distribution system for a data center utilizes an uninterruptible power supply (UPS). The UPS-based power supply and distribution system for a data center distributes mains electricity through a medium-voltage power distribution cabinet to a UPS power supply system that performs centralized power supply, and after a voltage of the mains electricity is reduced by a low frequency transformer, distributes the mains electricity to the UPS power supply through a low-voltage power distribution cabinet. The UPS power supply rectifies the mains electricity with a reduced voltage into a direct current and then inverts the rectified direct current together with a direct current provided by an energy storage battery into a 380 Vac alternating current. Finally, the current is distributed to the IT devices through a UPS output power distribution cabinet. The UPS-based power supply and distribution system for a data center requires at least the medium-voltage power distribution cabinet, the low frequency transformer, the low-voltage power distribution cabinet, a UPS rectifier link, an inverter link, and the UPS output power distribution cabinet, and therefore has disadvantages of excessive devices, complex links, and a large occupied space. In addition, the voltage of the mains electricity has to be reduced through the low frequency transformer by using a centralized power supply mode. As a power supply device is disposed outside an area in which an IT load is located, a long low-voltage bus is required to realize power distribution for the IT device. This poses disadvantages of a high line loss and high costs. The IEC 60038 defines a standard voltage from 1 kV to 35 kV in a power system as a medium voltage, and a voltage less than 1 kV as a low voltage. Generally, the industry uses this standard to distinguish between a medium voltage and a low voltage, and a slight fluctuation is may be allowed in practice. A common UPS power supply solution with a power of 2 MW is used as an example. Assuming that a rated current is 3030 A, a 3150 A low-voltage bus is required, incurring costs as high as several thousand yuan per meter and a loss reaching 78 W per meter. Another type of power supply and distribution system for a data center utilizes a high-voltage direct current (HVDC) for power transmission. The HVDC-based power supply and distribution system for a data center reduces a voltage of mains electricity through a low frequency transformer, and finally outputs the mains electricity, together with a direct current provided by an energy storage battery, as a 240 Vdc or 360 Vdc direct current. With a layout similar to that of the UPS-based power supply and distribution system for a data center, the HVDC-based power supply and distribution system for a data center also has disadvantages of excessive devices, complex links, and a large occupied space, as well as a lengthy low-voltage bus, a high line loss, and high costs.

In the conventional technology, there is also a type of power supply and distribution system for a data center that uses a rack power supply system and a power supply technology conforming to the Open Compute Project (OCP) specifications. In an existing OCP power supply-based power supply and distribution system for a data center, electricity power is distributed, through a medium-voltage power distribution cabinet, to a low frequency transformer and a low-voltage power distribution cabinet that are arranged in a centralized manner; a voltage of the electricity power is reduced by the low frequency transformer; and then the electricity power is distributed, through the low-voltage power distribution cabinet to an OCP power supply and an energy storage battery that are arranged in a distributed manner in respective IT cabinets. The OCP power supply-based power supply and distribution system for a data center requires the low frequency transformer and the low-voltage distribution cabinet to be disposed in a centralized manner. As a power supply device is disposed outside an area in which the IT cabinet is located, a lengthy low-voltage bus is required to realize power distribution for each IT cabinet. This poses disadvantages of a high line loss and high costs. In addition, the OCP power supply and the energy storage battery have to be disposed in each IT cabinet, occupying a space of the IT device. This is not conducive to reducing an overall occupied space of the power supply and distribution system for a data center.

Therefore, a solution is required, to not only provide a continuous, stable, balanced, and safe power supply environment required by IT devices in a data center, but also overcome the disadvantages of the power supply and distribution system for a data center in the conventional technology: excessive devices, complex links, and a large occupied space, as well as a lengthy low-voltage bus, a high line loss, and high costs.

SUMMARY

The embodiments aim to overcome disadvantages of a power supply and distribution system for a data center in a conventional technology: excessive devices, complex links, and a large occupied space, as well as a lengthy low-voltage bus, a high line loss, and high costs. Embodiments provide a power supply and distribution system for a data center, to reduce a voltage of distributed mains electricity through an SST power supply system in each area, so that there is no need to use a low frequency transformer for voltage reduction and no need to dispose the low frequency transformer and a corresponding low-voltage power distribution cabinet in a centralized manner. Instead, each SST power supply system may be deployed near a corresponding IT load, that is, deployed in a same area as the corresponding IT load. This helps reduce an occupied space, a length of a low-voltage bus, a loss, and costs. In addition, each SST power supply system does not need to reduce the voltage of the alternating-current mains electricity through the low frequency transformer, but directly converts the mains electricity or another alternating current into a direct current, which is used, together with a direct current output of an energy storage apparatus, as an input of an inverter module or an output of the SST power supply system. This reduces a quantity of required devices and simplifies the link. According to an actual situation, the mains electricity in the embodiments may be replaced by an input of an alternating current from another source.

According to a first aspect, an embodiment provides a solid state transformer (SST) power supply system. The SST power supply system includes a rectifier module, where the rectifier module performs voltage reduction and rectification on mains electricity by using an SST; and an energy storage apparatus, where a direct current output side of the energy storage apparatus is connected to a direct current output side of the rectifier module.

According to the solution described in the first aspect, the SST is used to perform voltage reduction and rectification on the mains electricity or another alternating current, so that there is no need to use a low frequency transformer for voltage reduction and no need to dispose the low frequency transformer and a corresponding low-voltage power distribution cabinet in a centralized manner. Instead, the SST power supply system may be deployed near a corresponding IT load, that is, deployed in a same area as the corresponding IT load. This helps reduce an occupied space, a length of a low-voltage bus, a loss, and costs. In addition, the mains electricity or another alternating current is directly converted into a direct current and then is connected to a direct current output of the energy storage apparatus. This reduces a quantity of required devices and simplifies a link while stabilizing an output.

According to the first aspect, in a possible implementation, the SST power supply system further includes an inverter module, where a direct current input side of the inverter module is connected to the direct current output side of the energy storage apparatus and the direct current output side of the rectifier module, and the inverter module inverts a direct current received by the direct current input side of the inverter module. In this way, an alternating current is output through the inverter module.

According to the first aspect, in a possible implementation, the SST power supply system further includes: a bypass apparatus, where the bypass apparatus is connected in parallel to the inverter module and then connected to the direct current output side of the energy storage apparatus and the direct current output side of the rectifier module, and the bypass apparatus is configured to bypass the inverter module. In this way, the bypass apparatus enables the SST power supply system to output an alternating current or a direct current. This facilitates flexible configuration according to an actual requirement.

According to a second aspect, an embodiment provides a power supply and distribution system for a data center. The power supply and distribution system for a data center includes a plurality of SST power supply systems. Each of the plurality of SST power supply systems includes a rectifier module that performs voltage reduction and rectification by using an SST and an energy storage apparatus connected to the rectifier module. The plurality of SST power supply systems are in a one-to-one correspondence with a plurality of cabinet units, and each of the plurality of cabinet units is configured to deploy an SST power supply system corresponding to the cabinet unit. The rectifier module in each of the plurality of SST power supply systems receives electric energy through a medium-voltage bus. The plurality of SST power supply systems supply electric power to a plurality of IT loads, the plurality of IT loads are in a one-to-one correspondence with the plurality of SST power supply systems, and each of the plurality of IT loads is located in a same area as a cabinet unit at which an SST power supply system corresponding to the IT load is located.

According to the solution described in the second aspect, the SST is used to perform voltage reduction and rectification on mains electricity, so that there is no need to use a low frequency transformer for voltage reduction and no need to dispose the low frequency transformer and a corresponding low-voltage power distribution cabinet in a centralized manner. Instead, the SST power supply system may be deployed near a corresponding IT load, that is, deployed in a same area as the corresponding IT load. This helps reduce an occupied space, a length of a low-voltage bus, a loss, and costs. In addition, the mains electricity or another alternating current is directly converted into a direct current and then is connected to a direct current output of the energy storage apparatus. This reduces a quantity of required devices and simplifies a link while stabilizing an output.

According to the second aspect, in a possible implementation, each of the plurality of SST power supply systems further includes an inverter module for inverting a direct current output of the rectifier module and a direct current output of the energy storage apparatus. In this way, the alternating current is stably output.

According to the second aspect, in a possible implementation, the plurality of SST power supply systems are in a one-to-one correspondence with a plurality of isolation apparatuses, and each of the plurality of isolation apparatuses is configured to isolate a cabinet unit at which an SST power supply system corresponding to the isolation apparatus is located and an IT load that corresponds to the SST power supply system corresponding to the isolation apparatus. In this way, safety is enhanced through the isolation apparatus.

According to the second aspect, in a possible implementation, the power supply and distribution system for a data center further includes: a plurality of medium-voltage switchgears, where the plurality of medium-voltage switchgears are in a one-to-one correspondence with the plurality of SST power supply systems, and each of the plurality of medium-voltage switchgears is configured to control alternating current transmission between the medium-voltage bus and an SST power supply system corresponding to the medium-voltage switchgear. In this way, independent control of electric energy distribution is achieved through the medium-voltage switchgear. This is conducive to intelligent electric energy distribution.

According to a third aspect, an embodiment provides a power supply and distribution system for a data center. The power supply and distribution system for a data center includes: a plurality of first SST power supply systems, where each of the plurality of first SST power supply systems includes a rectifier module that performs voltage reduction and rectification by using an SST and an energy storage apparatus connected to the rectifier module, the plurality of first SST power supply systems are in a one-to-one correspondence with a plurality of first cabinet units, each of the plurality of first cabinet units is configured to deploy a first SST power supply system corresponding to the first cabinet unit, and the plurality of first SST power supply systems each receive electric energy through a first medium-voltage bus; and a plurality of second SST power supply systems, where the plurality of second SST power supply systems are in a one-to-one correspondence with the plurality of first SST power supply systems, a type of electric power output by each of the plurality of second SST power supply systems is the same as a type of electric power output by a first SST power supply system corresponding to the second SST power supply system, the plurality of second SST power supply systems are in a one-to-one correspondence with a plurality of second cabinet units, each of the plurality of second cabinet units is configured to deploy a second SST power supply system corresponding to the second cabinet unit, each of the plurality of second cabinet units is located in a same area as a first cabinet unit at which a first SST power supply system that corresponds to a second SST power supply system corresponding to the second cabinet unit is located, and the plurality of second SST power supply systems each receives electric energy through a second medium-voltage bus. The plurality of first SST power supply systems are in a one-to-one correspondence with a plurality of IT loads, and each of the plurality of IT loads is located in a same area as a first cabinet unit at which a first SST power supply system corresponding to the IT load is located.

According to the solution described in the third aspect, the SST is used to perform voltage reduction and rectification on mains electricity, so that there is no need to use a low frequency transformer for voltage reduction and no need to dispose the low frequency transformer and a corresponding low-voltage power distribution cabinet in a centralized manner. Instead, the SST power supply system may be deployed near a corresponding IT load, that is, deployed in a same area as the corresponding IT load. This helps reduce an occupied space, a length of a low-voltage bus, a loss, and costs. In addition, the mains electricity or another alternating current is directly converted into a direct current and then is connected to a direct current output of the energy storage apparatus. This reduces a quantity of required devices and simplifies a link while stabilizing an output. In addition, supplying electric energy separately by using the first medium-voltage bus and the second medium-voltage bus can avoid a system shutdown loss caused by a fault.

According to the third aspect, in a possible implementation, each of the plurality of first SST power supply systems further includes an inverter module for inverting a direct current output of the rectifier module and a direct current output of the energy storage apparatus, and each of the plurality of second SST power supply systems outputs an alternating current. In this way, the alternating current is stably output.

According to the third aspect, in a possible implementation, the plurality of first SST power supply systems are in a one-to-one correspondence with a plurality of first isolation apparatuses, and each of the plurality of first isolation apparatuses is configured to isolate a first cabinet unit at which a first SST power supply system corresponding to the first isolation apparatus is located and an IT load that corresponds to the first SST power supply system corresponding to the first isolation apparatus. In this way, safety is enhanced through the isolation apparatus.

According to the third aspect, in a possible implementation, the power supply and distribution system for a data center further includes: a plurality of first medium-voltage switchgears, where the plurality of first medium-voltage switchgears are in a one-to-one correspondence with the plurality of first SST power supply systems, and each of the plurality of first medium-voltage switchgears is configured to control alternating current transmission between the first medium-voltage bus and a first SST power supply system corresponding to the first medium-voltage switchgear. In this way, independent control of electric energy distribution is achieved through the medium-voltage switchgear. This is conducive to intelligent electric energy distribution.

According to the third aspect, in a possible implementation, the plurality of second SST power supply systems are in a one-to-one correspondence with a plurality of second isolation apparatuses, and each of the plurality of second isolation apparatuses is configured to isolate a second cabinet unit at which a second SST power supply system corresponding to the second isolation apparatus is located and an IT load that corresponds to the second SST power supply system corresponding to the second isolation apparatus. In this way, safety is enhanced through the isolation apparatus.

According to the third aspect, in a possible implementation, the power supply and distribution system for a data center further includes: a plurality of second medium-voltage switchgears, where the plurality of second medium-voltage switchgears are in a one-to-one correspondence with the plurality of second SST power supply systems, and each of the plurality of second medium-voltage switchgears is configured to control alternating current transmission between the second medium-voltage bus and a second SST power supply system corresponding to the second medium-voltage switchgear. In this way, independent control of electric energy distribution is achieved through the medium-voltage switchgear. This is conducive to intelligent electric energy distribution.

According to a fourth aspect, an embodiment provides a power supply and distribution system for a data center. The power supply and distribution system for a data center includes a plurality of areas, where each of the plurality of areas is configured with an SST power supply system, and the SST power supply system includes a rectifier module that performs voltage reduction and rectification by using an SST and an energy storage apparatus connected to the rectifier module. Each of the plurality of areas is further configured with an IT load, and the IT load obtains electric energy through an SST power supply system located in the same area.

According to the solution described in the fourth aspect, the SST is used to perform voltage reduction and rectification on mains electricity, so that there is no need to use a low frequency transformer for voltage reduction and no need to dispose the low frequency transformer and a corresponding low-voltage power distribution cabinet in a centralized manner. Instead, the SST power supply system may be deployed near a corresponding IT load, that is, deployed in a same area as the corresponding IT load. This helps reduce an occupied space, a length of a low-voltage bus, a loss, and costs. In addition, the alternating-current mains electricity is directly converted into a direct current and then is connected to a direct current output of the energy storage apparatus. This reduces a quantity of required devices and simplifies a link while stabilizing an output.

According to the fourth aspect, in a possible implementation, the SST power supply system further includes an inverter module for inverting a direct current output of the rectifier module and a direct current output of the energy storage apparatus. In this way, the alternating current is stably output.

According to the fourth aspect, in a possible implementation, each of the plurality of areas is further configured with an isolation apparatus configured to isolate the IT load and the SST power supply system located in the same area. In this way, safety is enhanced through the isolation apparatus. According to the fourth aspect, in a possible implementation, the SST power supply system in each of the plurality of areas obtains a distributed alternating current through a medium-voltage bus, each of the plurality of areas is further configured with a medium-voltage switchgear, and the medium-voltage switchgear is configured to control alternating current transmission between the SST supply system and the medium-voltage bus located in the same area. In this way, independent control of electric energy distribution is achieved through the medium-voltage switchgear. This is conducive to intelligent electric energy distribution.

According to a fifth aspect, an embodiment provides a power supply and distribution system for a data center. The power supply and distribution system for a data center includes: a plurality of first SST power supply systems, where each of the plurality of first SST power supply systems includes a rectifier module that performs voltage reduction and rectification by using an SST and an energy storage apparatus connected to the rectifier module, the plurality of first SST power supply systems are in a one-to-one correspondence with a plurality of first cabinet units, and each of the plurality of first cabinet units is configured to deploy a first SST power supply system corresponding to the first cabinet unit; and a plurality of second SST power supply systems, where the plurality of second SST power supply systems are in a one-to-one correspondence with the plurality of first SST power supply systems, a type of electric power output by each of the plurality of second SST power supply systems is the same as a type of electric power output by a first SST power supply system corresponding to the second SST power supply system, the plurality of second SST power supply systems are in a one-to-one correspondence with a plurality of second cabinet units, each of the plurality of second cabinet units is configured to deploy a second SST power supply system corresponding to the second cabinet unit, each of the plurality of second cabinet units is located in a same area as a first cabinet unit at which a first SST power supply system that corresponds to a second SST power supply system corresponding to the second cabinet unit is located, the plurality of first SST power supply systems are in a one-to-one correspondence with a plurality of IT loads, and each of the plurality of IT loads is located in a same area as a first cabinet unit at which a first SST power supply system corresponding to the IT load is located; and a plurality of power supply and distribution units, where the plurality of power supply and distribution units operate independently; each of the plurality of power supply and distribution units includes a medium-voltage bus; and the medium-voltage bus included in each of the plurality of power supply and distribution units, the plurality of first SST power supply systems, and the plurality of second SST power supply systems are included in a DR system architecture.

According to the solution described in the fifth aspect, the SST is used to perform voltage reduction and rectification on mains electricity, so that there is no need to use a low frequency transformer for voltage reduction and no need to dispose the low frequency transformer and a corresponding low-voltage power distribution cabinet in a centralized manner. Instead, the SST power supply system may be deployed near a corresponding IT load, that is, deployed in a same area as the corresponding IT load. This helps reduce an occupied space, a length of a low-voltage bus, a loss, and costs. In addition, the alternating-current mains electricity is directly converted into a direct current and then is connected to a direct current output of the energy storage apparatus. This reduces a quantity of required devices and simplifies a link while stabilizing an output. In addition, the plurality of power supply and distribution units in the power supply and distribution system for a data center with the DR system architecture respectively supply electric energy to the IT loads, thereby avoiding a system shutdown loss caused by a faulty power supply and distribution unit.

According to the fifth aspect, in a possible implementation, each of the plurality of first SST power supply systems further includes an inverter module for inverting a direct current output of the rectifier module and a direct current output of the energy storage apparatus, and each of the plurality of second SST power supply systems outputs an alternating current. In this way, the alternating current is stably output.

According to the fifth aspect, in a possible implementation, the plurality of first SST power supply systems are in a one-to-one correspondence with a plurality of first isolation apparatuses, and each of the plurality of first isolation apparatuses is configured to isolate a first cabinet unit at which a first SST power supply system corresponding to the first isolation apparatus is located and an IT load that corresponds to the first SST power supply system corresponding to the first isolation apparatus. In this way, safety is enhanced through the isolation apparatus.

According to the fifth aspect, in a possible implementation, the power supply and distribution system for a data center further includes: a plurality of first medium-voltage switchgears, where the plurality of first medium-voltage switchgears are in a one-to-one correspondence with the plurality of first SST power supply systems, and each of the plurality of first medium-voltage switchgears is configured to control a first SST power supply system corresponding to the first medium-voltage switchgear to receive an alternating current. In this way, independent control of electric energy distribution is achieved through the medium-voltage switchgear. This is conducive to intelligent electric energy distribution.

According to the fifth aspect, in a possible implementation, the plurality of second SST power supply systems are in a one-to-one correspondence with a plurality of second isolation apparatuses, and each of the plurality of second isolation apparatuses is configured to isolate a second cabinet unit at which a second SST power supply system corresponding to the second isolation apparatus is located and an IT load that corresponds to the second SST power supply system corresponding to the second isolation apparatus. In this way, safety is enhanced through the isolation apparatus.

According to the fifth aspect, in a possible implementation, the power supply and distribution system for a data center further includes: a plurality of second medium-voltage switchgears, where the plurality of second medium-voltage switchgears are in a one-to-one correspondence with the plurality of second SST power supply systems, and each of the plurality of second medium-voltage switchgears is configured to control a second SST power supply system corresponding to the second medium-voltage switchgear to receive an alternating current. In this way, independent control of electric energy distribution is achieved through the medium-voltage switchgear. This is conducive to intelligent electric energy distribution.

According to a sixth aspect, an embodiment provides a power supply and distribution system for a data center. The power supply and distribution system for a data center includes: a plurality of SST power supply systems, where each of the plurality of SST power supply systems includes a rectifier module that performs voltage reduction and rectification by using an SST and an energy storage apparatus connected to the rectifier module, the plurality of SST power supply systems are in a one-to-one correspondence with a plurality of cabinet units, each of the plurality of cabinet units is configured to deploy an SST power supply system corresponding to the cabinet unit, the plurality of SST power supply systems are in a one-to-one correspondence with a plurality of IT loads, and each of the plurality of IT loads is located in a same area as a cabinet unit at which an SST power supply system corresponding to the IT load is located; and a plurality of power supply and distribution units, where the plurality of power supply and distribution units operate independently, and each of the plurality of power supply and distribution units includes a medium-voltage bus bar; and a power supply switching apparatus, where the power supply switching apparatus includes a plurality of static transfer switches STSs, the plurality of STSs are in a one-to-one correspondence with the plurality of SST power supply systems, and each of the plurality of STSs is configured to select, from the medium-voltage buses included in the plurality of power supply and distribution units, a medium-voltage bus connected to an SST power supply system corresponding to the STS.

According to the solution described in the sixth aspect, the SST is used to perform voltage reduction and rectification on mains electricity, so that there is no need to use a low frequency transformer for voltage reduction and no need to dispose the low frequency transformer and a corresponding low-voltage power distribution cabinet in a centralized manner. Instead, the SST power supply system may be deployed near a corresponding IT load, that is, deployed in a same area as the corresponding IT load. This helps reduce an occupied space, a length of a low-voltage bus, a loss, and costs. In addition, the alternating-current mains electricity is directly converted into a direct current and then is connected to a direct current output of the energy storage apparatus. This reduces a quantity of required devices and simplifies a link while stabilizing an output. In addition, the power supply switching apparatus can enable switching to a standby power supply and distribution unit when a power supply and distribution unit in operation becomes faulty, thereby avoiding a system shutdown loss caused by the faulty power supply and distribution unit.

According to the sixth aspect, in a possible implementation, each of the plurality of SST power supply systems further includes an inverter module for inverting a direct current output of the rectifier module and a direct current output of the energy storage apparatus. In this way, the alternating current is stably output.

According to the sixth aspect, in a possible implementation, the plurality of SST power supply systems are in a one-to-one correspondence with a plurality of isolation apparatuses, and each of the plurality of isolation apparatuses is configured to isolate a cabinet unit at which an SST power supply system corresponding to the isolation apparatus is located and an IT load that corresponds to the SST power supply system corresponding to the isolation apparatus. In this way, safety is enhanced through the isolation apparatus.

BRIEF DESCRIPTION OF DRAWINGS

To describe solutions in the embodiments or in the background, the following describes the accompanying drawings for describing the embodiments or the background.

DETAILED DESCRIPTION OF EMBODIMENTS

Figure 1:
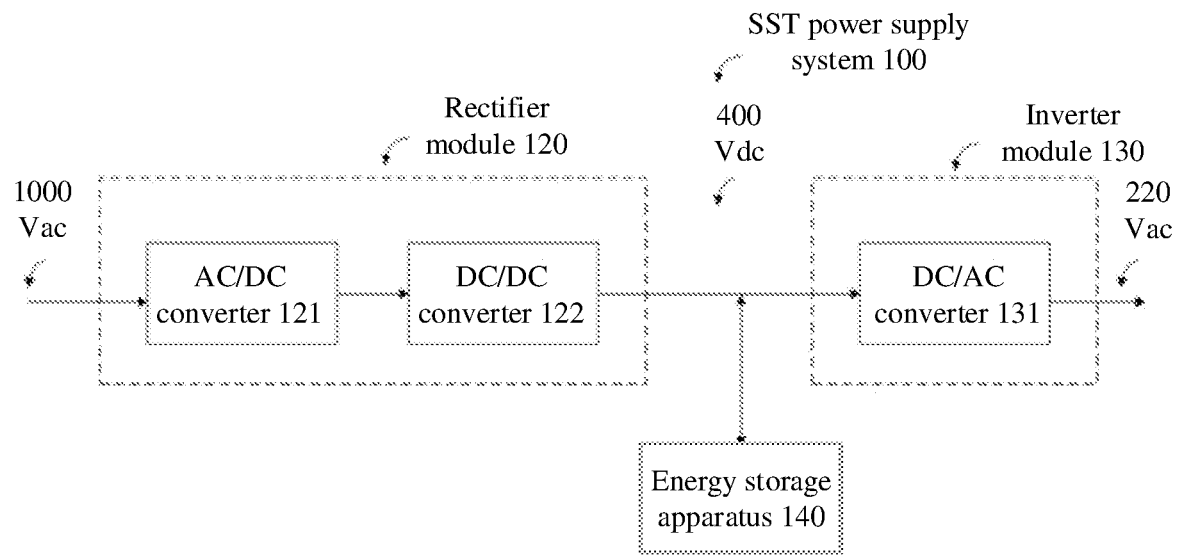
FIG. 1 is a block diagram of a structure of an SST power supply system in a first implementation according to an embodiment.

Embodiments provide a power supply and distribution system for a data center that is based on solid state transformer SST power supply systems, to overcome disadvantages of a power supply and distribution system for a data center in a conventional technology: excessive devices, complex links, and a large occupied space, as well as a lengthy low-voltage bus, a high line loss, and high costs. The power supply and distribution system for a data center includes a plurality of SST power supply systems. Each of the plurality of SST power supply systems includes a rectifier module that performs voltage reduction and rectification by using an SST and an energy storage apparatus connected to the rectifier module. The plurality of SST power supply systems are in a one-to-one correspondence with a plurality of cabinet units, and each of the plurality of cabinet units is configured to deploy an SST power supply system corresponding to the cabinet unit. The rectifier module in each of the plurality of SST power supply systems receives electric energy through a medium-voltage bus. The plurality of SST power supply systems supply electric power to a plurality of IT loads, the plurality of IT loads are in a one-to-one correspondence with the plurality of SST power supply systems, and each of the plurality of IT loads is located in a same area as a cabinet unit at which an SST power supply system corresponding to the IT load is located. In this way, a voltage of distributed mains electricity is reduced through an SST power supply system in each area, so that there is no need to use a low frequency transformer for voltage reduction and no need to dispose the low frequency transformer and a corresponding low-voltage power distribution cabinet in a centralized manner. Instead, each SST power supply system may be deployed near a corresponding IT load, that is, deployed in a same area as the corresponding IT load. This helps reduce an occupied space, a length of a low-voltage bus, a loss, and costs. In addition, each SST power supply system does not need to reduce the voltage of the alternating-current mains electricity through the low frequency transformer, but directly converts the alternating-current mains electricity into a direct current, which is used, together with a direct current output of the energy storage apparatus, as an input of an inverter module or an output of the SST power supply system. This reduces a quantity of required devices and simplifies the link. In addition, the power supply and distribution system for a data center provided by the embodiments may further include a medium-voltage switchgear and an isolation apparatus. In this way, independent operation of power distribution for the IT load in each area is implemented through the medium-voltage switchgear in each area, facilitating intelligent electric energy distribution; and isolation between a power distribution zone and an IT zone in each area is implemented through the isolation apparatus in each area, improving safety.

Embodiments may be applied to the following application scenarios: large, medium, and small data centers, research stations, scientific stations, or other scenarios requiring centralized processing and management for various electronic devices.

Embodiments may be adjusted and improved according to a specific application environment, and are not limited herein.

To make a person skilled in the art understand the solutions in the embodiments better, the following describes embodiments with reference to the accompanying drawings in embodiments.

FIG. 1 is a block diagram of a structure of an SST power supply system in a first implementation according to an embodiment. As shown in FIG. 1, an SST power supply system 100 includes a rectifier module 120, an inverter module 130, and an energy storage apparatus 140. The rectifier module 120 receives 1000 Vac alternating-current mains electricity, rectifies the 1000 Vac alternating-current mains electricity into a 400 Vdc direct current, and transmits, to the inverter module 130, the 400 Vdc direct current together with a direct current output by the energy storage apparatus 140. Finally, the inverter module 130 inverts the two direct currents into a 220 Vac alternating current and outputs the 220 Vac alternating current to an IT load to which an alternating current input source is applicable. The rectifier module 120 further includes: an AC/DC converter 121 configured to convert the alternating-current mains electricity received by the rectifier module 120 into a low-voltage direct current; and a DC/DC converter 122 configured to convert the low-voltage direct current output by the AC/DC converter 121 into the 400 Vdc direct current. The 400 Vdc direct current output by the rectifier module 120 is connected to an input of the inverter module 130. The direct current output of the energy storage apparatus 140 is also connected to the input of the inverter module 130 for stabilizing the output of the rectifier module 120, so that the input of the inverter module 130 has a stable direct-current voltage, thereby realizing uninterruptible power supply of the SST power supply system 100. It should be understood that the SST power supply system 100 utilizes a solid state transformer (SST), which is also referred to as a power electronic transformer (PET) or an electronic power transformer (EPT), that is, utilizes a high-frequency transformer rather than a low frequency transformer, thereby greatly reducing a size and a weight of the transformer. In other words, the SST power supply system 100 implements a process of voltage reduction from the 1000 Vac alternating-current mains electricity to the output 220 Vac alternating current by using the SST, so that the low frequency transformer is not required for voltage reduction and the low frequency transformer and a corresponding low-voltage power distribution cabinet do not need to be deployed in a centralized manner. Therefore, the SST power supply system 100 can be deployed near an IT device. This helps reduce an occupied space, a length of a low-voltage bus, a loss, and costs. In addition, the SST power supply system 100 does not need to reduce the voltage of the alternating-current mains electricity through the low frequency transformer, but directly converts the 1000 Vac alternating-current mains electricity into the 400 Vdc direct current, which is used, together with the direct current output of the energy storage apparatus 140, as an input of the inverter module 130. This reduces a quantity of required devices and simplifies the link. It should be understood that the output 220 Vac alternating current in the SST power supply system 100 shown in FIG. 1 is merely an example. In some embodiments, an alternating current of another specification such as 400 Vac, may alternatively be output. The energy storage apparatus 140 may be a lithium battery, a lithium battery module, or another type of energy storage apparatus. Alternatively, a plurality of lithium battery modules may be connected in parallel to provide a direct-current compensation power supply to achieve a stable direct-current voltage. In some embodiments, the SST power supply system 100 further includes a cabinet unit (not shown) for disposing various components of the SST power supply system 100. The cabinet unit may alternatively be separately disposed and independent of the SST power supply system 100.

Figure 2:
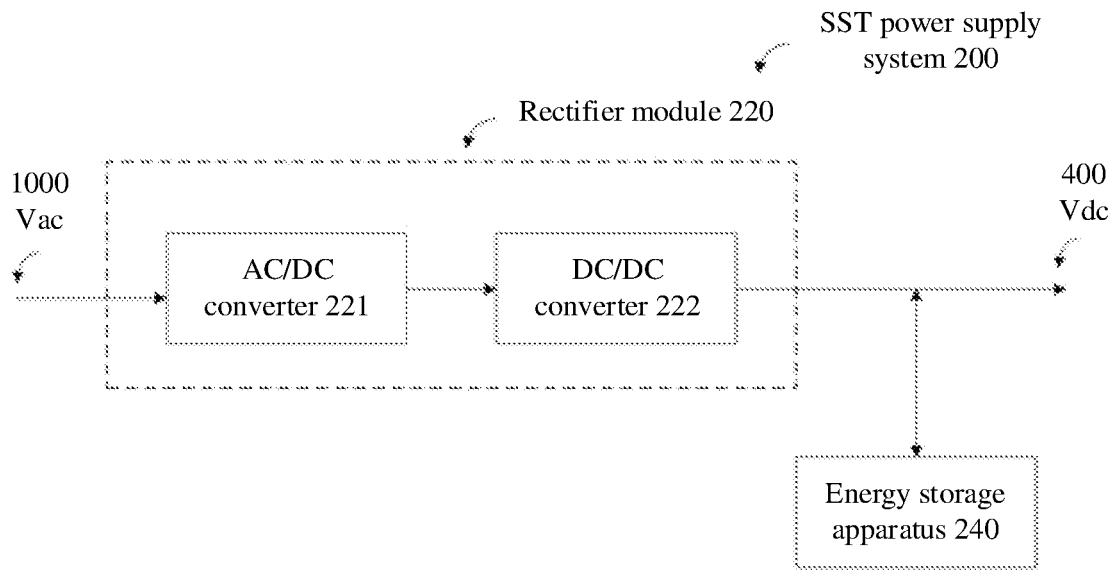
FIG. 2 is a block diagram of a structure of an SST power supply system in a second implementation according to an embodiment.

FIG. 2 is a block diagram of a structure of an SST power supply system in a second implementation according to an embodiment. As shown in FIG. 2, an SST power supply system 200 includes a rectifier module 220, and an energy storage apparatus 240. The rectifier module 220 receives 1000 Vac alternating-current mains electricity, rectifies the 1000 Vac alternating-current mains electricity into a 400 Vdc direct current, and transmits, to an IT load to which a direct current input source is applicable, the 400 Vdc direct current together with a direct current output by the energy storage apparatus 240. The rectifier module 220 further includes: an AC/DC converter 221 configured to convert the alternating-current mains electricity received by the rectifier module 220 into a low-voltage direct current; and a DC/DC converter 222 configured to convert the low-voltage direct current output by the AC/DC converter 221 into the 400 Vdc direct current. The 400 Vdc direct current output by the rectifier module 220 is directly output to the IT load. The direct current output of the energy storage apparatus 240 is also connected to an output of the SST power supply system 200 for stabilizing the output of the rectifier module 220, so that the output of the SST power supply system 200 has a stable direct-current voltage, thereby realizing uninterruptible power supply of the SST power supply system 200. It should be understood that the SST power supply system 200 utilizes a solid state transformer SST, which is also referred to as a power electronic transformer PET or an electronic power transformer EPT, that is, utilizes a high-frequency transformer rather than a low frequency transformer, thereby greatly reducing a size and a weight of the transformer. In other words, the SST power supply system 200 implements a process of voltage reduction from the 1000 Vac alternating-current mains electricity to the output 400 Vdc direct current by using the SST, so that the low frequency transformer is not required for voltage reduction and the low frequency transformer and a corresponding low-voltage power distribution cabinet do not need to be deployed in a centralized manner. Therefore, the SST power supply system 200 can be deployed near an IT device. This helps reduce an occupied space, a length of a low-voltage bus, a loss, and costs. In addition, the SST power supply system 200 does not need to reduce the voltage of the alternating-current mains electricity through the low frequency transformer, but directly converts the 1000 Vac alternating-current mains electricity into the 400 Vdc direct current, which is used, together with the direct current output of the energy storage apparatus 240, as the output of the SST power supply system 200. This reduces a quantity of required devices and simplifies the link. It should be understood that the output 400 Vdc direct current in the SST power supply system 200 shown in FIG. 2 is merely an example. In some example embodiments, a direct current of another specification such as 240 Vdc, may alternatively be output. The energy storage apparatus 240 may be a lithium battery, a lithium battery module, or another type of energy storage apparatus. Alternatively, a plurality of lithium battery modules may be connected in parallel to provide a direct-current compensation power supply to achieve a stable direct-current voltage. In some example embodiments, the SST power supply system 200 further includes a cabinet unit (not shown) for disposing various components of the SST power supply system 200. The cabinet unit may alternatively be separately disposed and independent of the SST power supply system 200.

Figure 3:
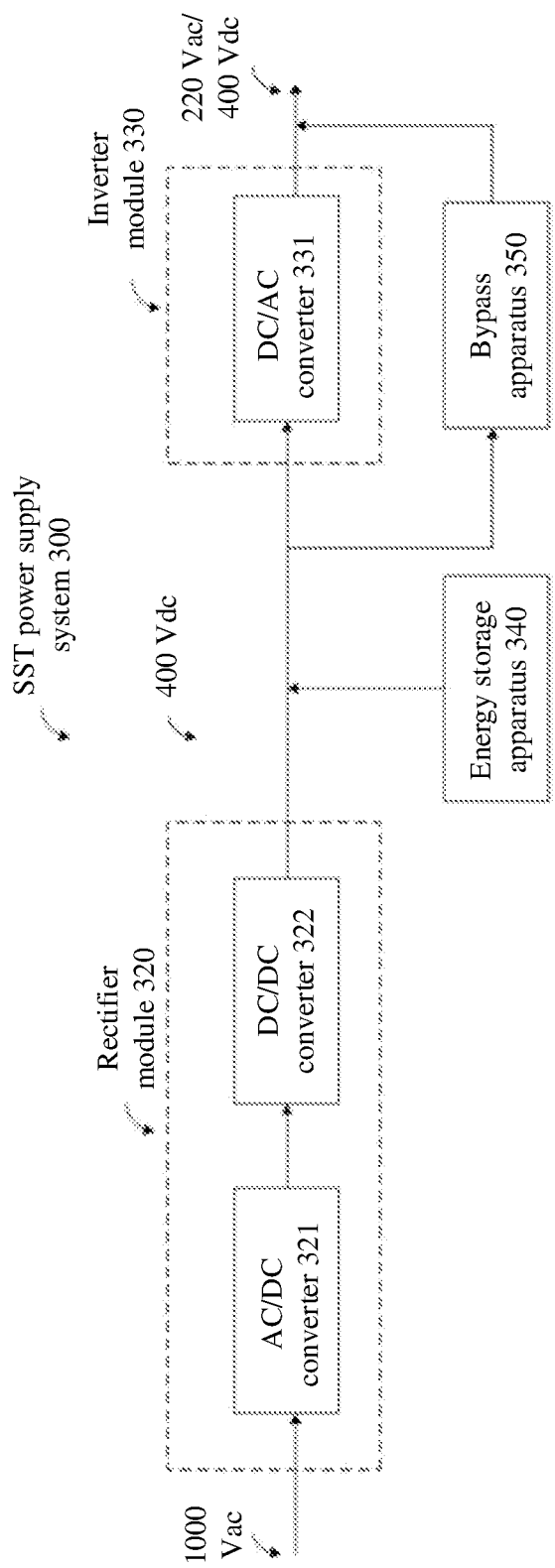
FIG. 3 is a block diagram of a structure of an SST power supply system in a third implementation according to an embodiment.

FIG. 3 is a block diagram of a structure of an SST power supply system in a third implementation according to an embodiment. As shown in FIG. 3, an SST power supply system 300 includes a rectifier module 320, an inverter module 330, an energy storage apparatus 340, and a bypass apparatus 350. The rectifier module 320 receives 1000 Vac alternating-current mains electricity, rectifies the 1000 Vac alternating-current mains electricity into a 400 Vdc direct current, and transmits, to the inverter module 330, the 400 Vdc direct current output together with a direct current output by the energy storage apparatus 340. Finally, the inverter module 330 inverts the two direct currents into a 220 Vac alternating current and outputs the 220 Vac alternating current to an IT load to which an alternating current input source is applicable. The bypass apparatus 350 is connected in parallel to the inverter module 330 between an output of the rectifier module 320 and an output of the SST power supply system 300. The bypass apparatus 350 is configured to perform bypass processing on the inverter module 330, so that the 400 Vdc direct current output by the rectifier module 320 and the direct current output by the energy storage apparatus 340 bypass the inverter module 330, and then are directly used as a direct current at the output of the SST power supply system 300. Therefore, through the operation of the bypass apparatus 350, it is possible to switch between the 220 Vac alternating current output through the inverter module 330 and the 400 Vdc direct current output without passing the inverter module 330, that is, by bypassing the inverter module 330. The rectifier module 320 further includes: an AC/DC converter 321 configured to convert the alternating-current mains electricity received by the rectifier module 320 into a low-voltage direct current; and a DC/DC converter 322 configured to convert the low-voltage direct current output by the AC/DC converter 321 into the 400 Vdc direct current. The 400 Vdc direct current output by the rectifier module 320 is connected to an input of the inverter module 330 or directly connected to the output of the SST power supply system 300 through the operation of the bypass apparatus 350. The direct current output of the energy storage apparatus 340 is also connected to the input of the inverter module 330 or directly connected to the output of the SST power supply system 300 through the operation of the bypass apparatus 350 for stabilizing the output of the rectifier module 320, so that the input of the inverter module 330 or the output of the SST power supply system 300 has a stable direct-current voltage, thereby realizing uninterruptible power supply of the SST power supply system 300. It should be understood that the SST power supply system 300 utilizes a solid state transformer SST, which is also referred to as a power electronic transformer PET or an electronic power transformer EPT, that is, utilizes a high-frequency transformer rather than a low frequency transformer, thereby greatly reducing a size and a weight of the transformer. In other words, the SST power supply system 300 implements a process of voltage reduction from the 1000 Vac alternating-current mains electricity to the output 220 Vac alternating current or the 400 Vdc direct current by using the SST, so that the low frequency transformer is not required for voltage reduction and the low frequency transformer and a corresponding low-voltage power distribution cabinet do not need to be deployed in a centralized manner. Therefore, the SST power supply system 300 can be deployed near an IT device. This helps reduce an occupied space, a length of a low-voltage bus, a loss, and costs. In addition, the SST power supply system 300 does not need to reduce the voltage of the alternating-current mains electricity through the low frequency transformer, but directly converts the 1000 Vac alternating-current mains electricity into the 400 Vdc direct current, which is used, together with the direct current output of the energy storage apparatus 340, as the input of the inverter module 330 or the output of the SST power supply system 300. This reduces a quantity of required devices and simplifies the link. In addition, the bypass apparatus 350 enables the SST power supply system 300 to output an alternating current or a direct current. This facilitates flexible configuration according to an actual requirement. It should be understood that the output 220 Vac alternating current or 400 Vdc direct current in the SST power supply system 300 shown in FIG. 3 is merely an example. In some example embodiments, an alternating current of another specification such as 400 Vac or a direct current of another specification such as 240 Vdc may alternatively be output. The energy storage apparatus 340 may be a lithium battery, a lithium battery module, or another type of energy storage apparatus. Alternatively, a plurality of lithium battery modules may be connected in parallel to provide a direct-current compensation power supply to achieve a stable direct-current voltage. In some example embodiments, the SST power supply system 300 further includes a cabinet unit (not shown) for disposing various components of the SST power supply system 300. The cabinet unit may alternatively be separately disposed and independent of the SST power supply system 300.

Figure 4:
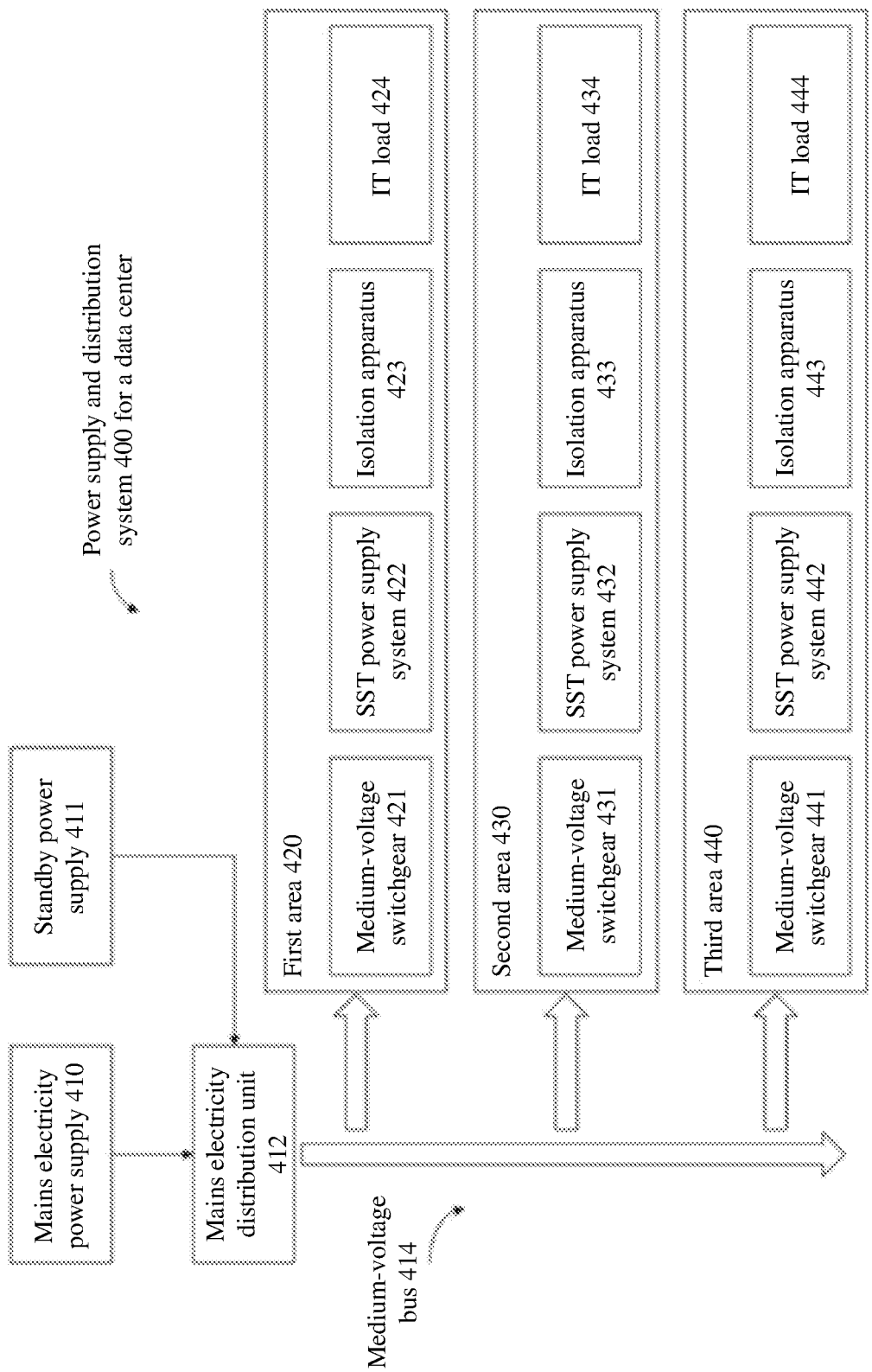
FIG. 4 is a block diagram of a power supply and distribution system for a data center in a first implementation according to an embodiment.

FIG. 4 is a block diagram of a power supply and distribution system for a data center in a first implementation according to an embodiment. As shown in FIG. 4, a power supply and distribution system 400 for a data center receives alternating-current mains electricity from a mains electricity power supply 410. The mains electricity power supply 410 and a standby power supply 411 together provide an input to a mains electricity distribution unit 412, where an output of the mains electricity distribution unit 412 is connected to a medium-voltage bus 414, and the medium-voltage bus 414 is connected to the power supply and distribution system 400 for a data center and supplies distributed mains electricity. The power supply and distribution system 400 for a data center includes various SST power supply systems and other devices distributed in three areas. A medium-voltage switchgear 421, an SST power supply system 422, an isolation apparatus 423, and an IT load 424 are deployed in a first area 420; a medium-voltage switchgear 431, an SST power supply system 432, an isolation apparatus 433, and an IT load 434 are deployed in a second area 430; and a medium-voltage switchgear 441, an SST power supply system 442, an isolation apparatus 443, and an IT load 444 are deployed in a third area 440. Using the SST power supply system 422 deployed in the first area 420 as an example, the medium-voltage switchgear 421 is connected to the medium-voltage bus 414 and receives mains electricity distributed to the first area 420 from the medium-voltage bus. Necessary instruments, automatic control apparatuses, motor magnetic switches, various alternating current contactors, and the like are disposed inside the medium-voltage switchgear 421, to implement functions of enabling/disabling, controlling, and protecting an electrical device in a process of receiving and distributing mains electricity. The medium-voltage switchgear 421 distributes the mains electricity to the corresponding SST power supply system 422. The SST power supply system 422 may be the SST power supply system 100 shown in FIG. 1, the SST power supply system 200 shown in FIG. 2, or the SST power supply system 300 shown in FIG. 3, or may be any appropriate variation or combination made based on the structures of the SST power supply systems shown in FIG. 1 to FIG. 3. This is not limited herein. It should be understood that depending on whether the SST power supply system 422 outputs an alternating current or a direct current, the corresponding IT load 424 in the first area should also be configured to be suitable for receiving an alternating current input or a direct current input. The isolation apparatus 423 is configured to isolate the SST power supply system 422 and the IT load 424. The isolation apparatus 423 may be an isolation cabinet or another type of apparatus having an isolation function. The IT load 424 may include any possible combination of IT cabinets or various types of IT devices (such as a computer, a server, a network device, and a storage device). It should be understood that the medium-voltage switchgear 421 and the SST power supply system 422 disposed in the first area 420 may be defined as a power distribution zone of the first area 420 for receiving mains electricity to be distributed to the first area 420 for distribution. An area in which the IT load 424 is located may be defined as an IT zone of the first area 420, which refers to a physical space that provides functions and services such as centralized processing, storage, transmission, exchange, and management for various IT devices. The isolation apparatus 423 is configured to isolate the power distribution zone from the IT zone. It should be understood that the first area 420 may be understood as a specific floor in a building with a plurality of floors, and the medium-voltage switchgear 421, the SST power supply system 422, the isolation apparatus 423, and the IT load 424 located in the first area 420 are all located on the same floor. The first area 420 may alternatively be understood as a complete area obtained through division in a physical space on a same plane, for example, a compartment in a planar layer structure including a plurality of compartments. The first area 420, the second area 430, and the third area 440 are three areas that are independent of each other, and may be understood as different floors in a building with a plurality of floors, or may be understood as different areas in a physical space on a same plane. In some example embodiments, the first area 420 and the second area 430 may be different areas of a space located on a same floor, while the third area 440 is located on a different floor from the first area 420 and the second area 430.

Referring to FIG. 4, details of the SST power supply system 432 and other components disposed in the second area 430 and relationships in between are similar to details of the SST power supply system 422 and other components disposed in the first area 420 and relationships in between. Details are not described herein again. Details of the SST power supply system 442 and other components disposed in the third area 440 and relationships in between are similar to the details of the SST power supply system 422 and other components disposed in the first area 420 and the relationships in between. Details are not described herein again. It should be understood that the medium-voltage bus 414 is connected to each of the medium-voltage switchgear 421 deployed in the first area 420, the medium-voltage switchgear 431 deployed in the second area 430, and the medium-voltage switchgear 441 deployed in the third area 440; and supplies mains electricity for distribution. Through a switching operation of the respective medium-voltage switchgear, each area can independently receive and distribute the mains electricity. The three areas 420, 430, and 440 shown in FIG. 4 are used as examples only, and in some example embodiments, the power supply and distribution system 400 for a data center may have another quantity of areas. For example, the power supply and distribution system 400 for a data center may have N areas, where N is a positive integer greater than or equal to 1, and the N areas are deployed with respective medium-voltage switchgears, SST power supply systems, isolation apparatuses, and IT loads. Details of the SST power supply system and other components in each of the N areas and relationships in between are similar to the foregoing details of the SST power supply system 422 and other components in the first area 420 and the relationships in between.

Still referring to FIG. 4, a voltage of distributed mains electricity is reduced through the SST power supply system in each area, so that there is no need to use a low frequency transformer for voltage reduction and no need to dispose the low frequency transformer and a corresponding low-voltage power distribution cabinet in a centralized manner. Therefore, each SST power supply system may be deployed near a corresponding IT load, that is, deployed in a same area as the corresponding IT load. This helps reduce an occupied space, a length of a low-voltage bus, a loss, and costs. In addition, each SST power supply system does not need to reduce the voltage of the alternating-current mains electricity through the low frequency transformer, but directly converts the alternating-current mains electricity into a direct current, which is used, together with a direct current output of an energy storage apparatus, as an input of an inverter module or an output of the SST power supply system. This reduces a quantity of required devices and simplifies a link. In this way, independent operation of power distribution for the IT load in each area is implemented through the medium-voltage switchgear in each area, facilitating intelligent electric energy distribution; and isolation between a power distribution zone and an IT zone in each area is implemented through the isolation apparatus in each area, improving safety.

Figure 5:
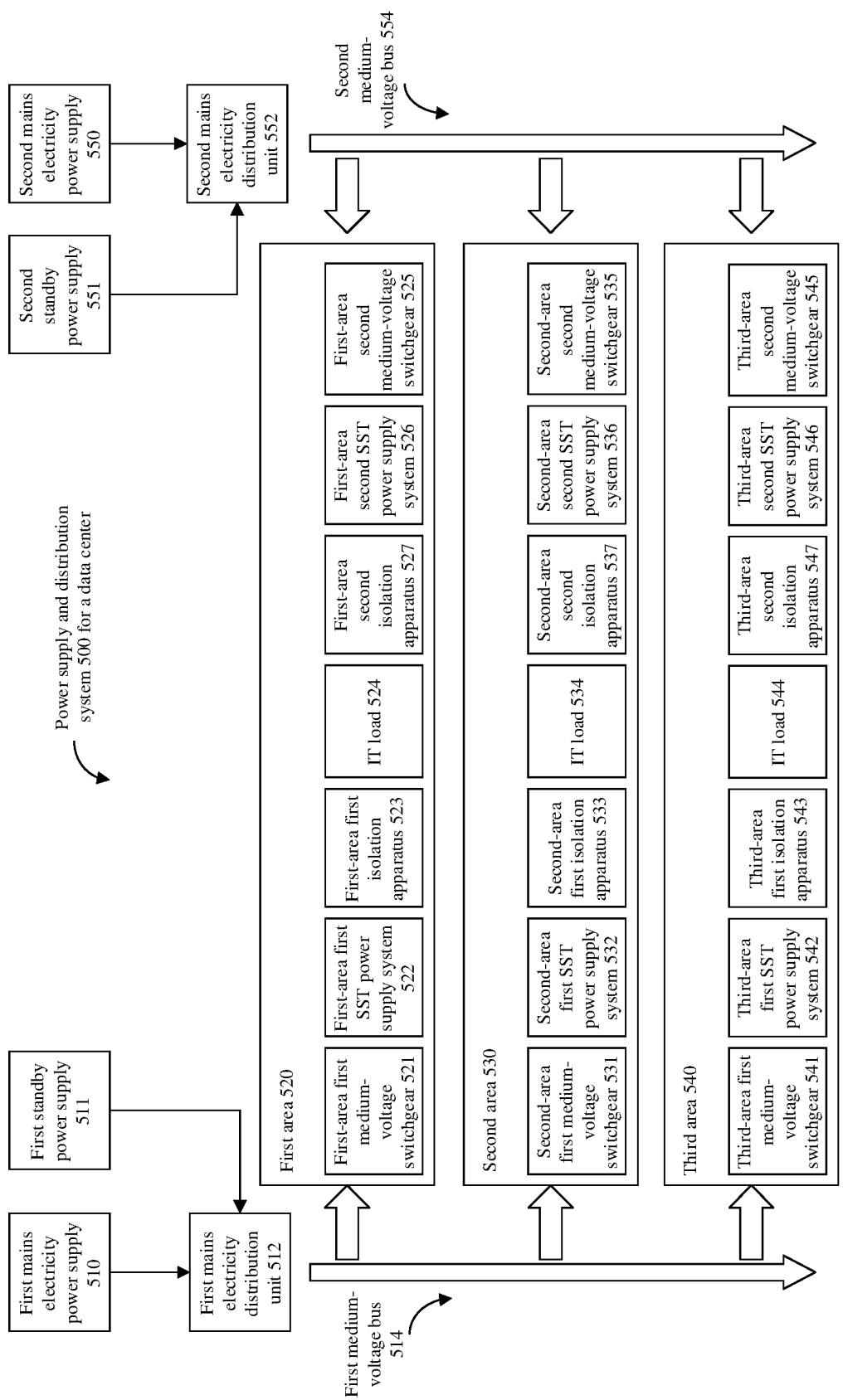
FIG. 5 is a block diagram of a power supply and distribution system for a data center in a second implementation according to an embodiment.

FIG. 5 is a block diagram of a power supply and distribution system for a data center in a second implementation according to an embodiment. As shown in FIG. 5, a power supply and distribution system 500 for a data center uses a 2N system architecture, that is, includes two power supply and distribution units, each of which can meet a power consumption need of all loads and operate simultaneously as a standby for each other. When the power supply and distribution system 500 for a data center is in normal operation, each power supply and distribution unit provides half of electric energy to the loads. When one of the power supply and distribution units is faulty, the other power supply and distribution unit provides all the electric energy. A first power supply and distribution unit of the power supply and distribution system 500 for a data center includes a first mains electricity power supply 510, a first standby power supply 511, a first mains electricity distribution unit 512, and a first medium-voltage bus 514. The first mains electricity power supply 510 and the first standby power supply 511 together provide an input to the first mains electricity distribution unit 512, where an output of the first mains electricity distribution unit 512 is connected to the first medium-voltage bus 514, and the first medium-voltage bus 514 is connected to the power supply and distribution system 500 for a data center and supplies distributed mains electricity. A second power supply and distribution unit of the power supply and distribution system 500 for a data center includes a second mains electricity power supply 550, a second standby power supply 551, a second mains electricity distribution unit 552, and a second medium-voltage bus 554. Relationships between the components of the second power supply and distribution unit of the power supply and distribution system 500 for a data center are similar to relationships in the first power supply and distribution unit. Details are not described herein again.

Still referring to FIG. 5, the power supply and distribution system 500 for a data center includes various SST power supply systems and other devices distributed in three areas. In each area, there are two sets of SST power supply systems, which are respectively connected to the first power supply and distribution unit and the second power supply and distribution unit of the power supply and distribution system 500 for a data center with the 2N system architecture. A first area 520 includes a first-area first medium-voltage switchgear 521, a first-area first SST power supply system 522, a first-area first isolation apparatus 523, and an IT load 524; and further includes a first-area second medium-voltage switchgear 525, a first-area second SST power supply system 526, and a first-area second isolation apparatus 527. A second area 530 includes a second-area first medium-voltage switchgear 531, a second-area first SST power supply system 532, a second-area first isolation apparatus 533, and an IT load 534; and further includes a second-area second medium-voltage switchgear 535, a second-area second SST power supply system 536, and a second-area second isolation apparatus 537. A third area 540 includes a third-area first medium-voltage switchgear 541, a third-area first SST power supply system 542, a third-area first isolation apparatus 543, and an IT load 544; and further includes a third-area second medium-voltage switchgear 545, a third-area second SST power supply system 546, and a third-area second isolation apparatus 547. The first-area first medium-voltage switchgear 521 in the first area 520, the second-area first medium-voltage switchgear 531 in the second area 530, and the third-area first medium-voltage switchgear 541 in the third area 540 each are connected to the first medium-voltage bus 514 and receive electric energy from the first power supply and distribution unit of the power supply and distribution system 500 for a data center. Correspondingly, the first-area second medium-voltage switchgear 525 in the first area 520, the second-area second medium-voltage switchgear 535 in the second area 530, and the third-area second medium-voltage switchgear 545 in the third area 540 each are connected to the second medium-voltage bus 554 and receive electric energy from the second power supply and distribution unit of the power supply and distribution system 500 for a data center.

Still referring to FIG. 5, the components deployed in the first area 520 are used as an example. The first-area first medium-voltage switchgear 521 is connected to the first medium-voltage bus 514 and receives mains electricity distributed to the first area 520 from the first medium-voltage bus 514. Necessary instruments, automatic control apparatuses, motor magnetic switches, various alternating current contactors, and the like are disposed inside the first-area first medium-voltage switchgear 521, to implement functions of enabling/disabling, controlling, and protecting an electrical device in a process of receiving and distributing mains electricity. The first-area first medium-voltage switchgear 521 distributes the mains electricity to the corresponding first-area first SST power supply system 522. The first-area first SST power supply system 522 may be the SST power supply system 100 shown in FIG. 1, the SST power supply system 200 shown in FIG. 2, or the SST power supply system 300 shown in FIG. 3, or may be any appropriate variation or combination made based on the structures of the SST power supply systems shown in FIG. 1 to FIG. 3. This is not limited herein. It should be understood that depending on whether the first-area first SST power supply system 522 outputs an alternating current or a direct current, the corresponding IT load 524 in the first area should also be configured to be suitable for receiving an alternating current input or a direct current input. The first-area first isolation apparatus 523 is configured to isolate the first-area first SST power supply system 522 and the IT load 524. The first-area first isolation apparatus 523 may be an isolation cabinet or another type of apparatus having an isolation function. The IT load 524 may include any possible combination of IT cabinets or various types of IT devices (such as a computer, a server, a network device, and a storage device). It should be understood that the first-area first medium-voltage switchgear 521 and the first-area first SST power supply system 522 disposed in the first area 520 may be defined as a first power distribution zone of the first area 520 for receiving mains electricity to be distributed to the first area 520 for distribution. An area in which the IT load 524 is located may be defined as an IT zone of the first area 520, which refers to a physical space that provides functions and services such as centralized processing, storage, transmission, exchange, and management for various IT devices. The first-area first isolation apparatus 523 is configured to isolate the first power distribution zone from the IT zone. In this way, the first-area first medium-voltage switchgear 521 and the first-area first SST power supply system 522 in the first area 520 can independently receive mains electricity distributed by the first medium-voltage bus 514 and supply the mains electricity the IT load 524. Correspondingly, the first-area second medium-voltage switchgear 525 is connected to the second medium-voltage bus 554 and receives mains electricity distributed to the first area 520 from the second medium-voltage bus 554. Necessary instruments, automatic control apparatuses, motor magnetic switches, various alternating current contactors, and the like are disposed inside the first-area second medium-voltage switchgear 525, to implement functions of enabling/disabling, controlling, and protecting an electrical device in a process of receiving and distributing mains electricity. The first-area second medium-voltage switchgear 525 distributes the mains electricity to the corresponding first-area second SST power supply system 526. The first-area second SST power supply system 526 may be the SST power supply system 100 shown in FIG. 1, the SST power supply system 200 shown in FIG. 2, or the SST power supply system 300 shown in FIG. 3, or may be any appropriate variation or combination made based on the structures of the SST power supply systems shown in FIG. 1 to FIG. 3. This is not limited herein. It should be understood that depending on whether the first-area second SST power supply system 526 outputs an alternating current or a direct current, the corresponding IT load 524 in the first area should also be configured to be suitable for receiving an alternating current input or a direct current input. The first-area second isolation apparatus 527 is configured to isolate the first-area second SST power supply system 526 and the IT load 524. The first-area second isolation apparatus 527 may be an isolation cabinet or another type of apparatus having an isolation function. The IT load 524 may include any possible combination of IT cabinets or various types of IT devices (such as a computer, a server, a network device, and a storage device). It should be understood that the first-area second medium-voltage switchgear 525 and the first-area second SST power supply system 526 disposed in the first area 520 may be defined as a second power distribution zone of the first area 520 for receiving mains electricity to be distributed to the first area 520 for distribution. The first-area second isolation apparatus 527 is configured to isolate the second power distribution zone from the IT zone. In this way, the first-area second medium-voltage switchgear 525 and the first-area second SST power supply system 526 in the first area 520 can independently receive mains electricity distributed by the second medium-voltage bus 554 and supply the mains electricity the IT load 524. It should be understood that the first-area first SST power supply system 522 in the first area 520 and the first-area second SST power supply system 526 should both output direct currents or alternating currents, to distribute the currents to the corresponding IT load 524.

Still referring to FIG. 5, the first area 520 has the first power distribution zone and the second power distribution zone that are independent of each other, for respectively receiving and distributing the mains electric energy provided by the first power supply and distribution unit and the second power supply and distribution unit of the power supply and distribution system 500 for a data center with the 2N system architecture. It should be understood that the first area 520 may be understood as a specific floor in a building with a plurality of floors, and the components located in the first area 520 are all located on the same floor. The first area 520 may alternatively be understood as a complete area obtained through division in a physical space on a same plane, for example, a compartment in a planar layer structure including a plurality of compartments. The first area 520, the second area 530, and the third area 540 are three areas that are independent of each other, and may be understood as different floors in a building with a plurality of floors, or may be understood as different areas in a physical space on a same plane. In some example embodiments, the first area 520 and the second area 530 may be different areas of a space located on a same floor, while the third area 540 is located on a different floor from the first area 520 and the second area 530.

Referring to FIG. 5, details of the components disposed in the second area 530 and relationships in between are similar to details of the components disposed in the first area 520 and relationships in between. Details are not described herein again. Details of the components disposed in the third area 540 and relationships in between are similar to the details of the components disposed in the first area 520 and the relationships in between. Details are not described herein again. It should be understood that the first medium-voltage bus 514 is connected to each of the first-area first medium-voltage switchgear 521 deployed in the first area 520, the second-area first medium-voltage switchgear 531 deployed in the second area 530, and the third-area first medium-voltage switchgear 541 deployed in the third area 540; and supplies mains electricity for distribution. Through a switching operation of the respective medium-voltage switchgear, each area can independently receive and distribute the mains electricity from the first medium-voltage bus 514. The second medium-voltage bus 554 is connected to each of the first-area second medium-voltage switchgear 525 deployed in the first area 520, the second-area second medium-voltage switchgear 535 deployed in the second area 530, and the third-area second medium-voltage switchgear 545 deployed in the third area 540; and supplies mains electricity for distribution. Through a switching operation of the respective medium-voltage switchgear, each area can independently receive and distribute the mains electricity from the second medium-voltage bus 554. The three areas 520, 530, and 540 shown in FIG. are used as examples only, and in some example embodiments, the power supply and distribution system 500 for a data center may have another quantity of areas. For example, the power supply and distribution system 500 for a data center may have N areas, where N is a positive integer greater than or equal to 1, and each of the N areas is deployed with two respective sets of medium-voltage switchgears, SST power supply systems, isolation apparatuses for connecting the first power supply and distribution unit and the second power supply and distribution unit, and IT loads. Details of the components in each of the N areas and relationships in between are similar to the foregoing details of the components in the first area 520 and the relationships in between.

Still referring to FIG. 5, a voltage of distributed mains electricity is reduced through the SST power supply system in each area, so that there is no need to use a low frequency transformer for voltage reduction and no need to dispose the low frequency transformer and a corresponding low-voltage power distribution cabinet in a centralized manner. Therefore, each SST power supply system may be deployed near a corresponding IT load, that is, deployed in a same area as the corresponding IT load. This helps reduce an occupied space, a length of a low-voltage bus, a loss, and costs. In addition, each SST power supply system does not need to reduce the voltage of the alternating-current mains electricity through the low frequency transformer, but directly converts the alternating-current mains electricity into a direct current, which is used, together with a direct current output of an energy storage apparatus, as an input of an inverter module or an output of the SST power supply system. This reduces a quantity of required devices and simplifies a link. In this way, independent operation of power distribution for the IT load in each area is implemented through the medium-voltage switchgear in each area, facilitating intelligent electric energy distribution; and isolation between a power distribution zone and an IT zone in each area is implemented through the isolation apparatus in each area, improving safety. In addition, through simultaneous supply of electric energy to each IT load by the first power supply and distribution unit and the second power supply and distribution unit of the power supply and distribution system 500 for a data center with the 2N system architecture, it is also possible to avoid a system shutdown loss caused by a faulty power supply and distribution unit.

Figure 6:
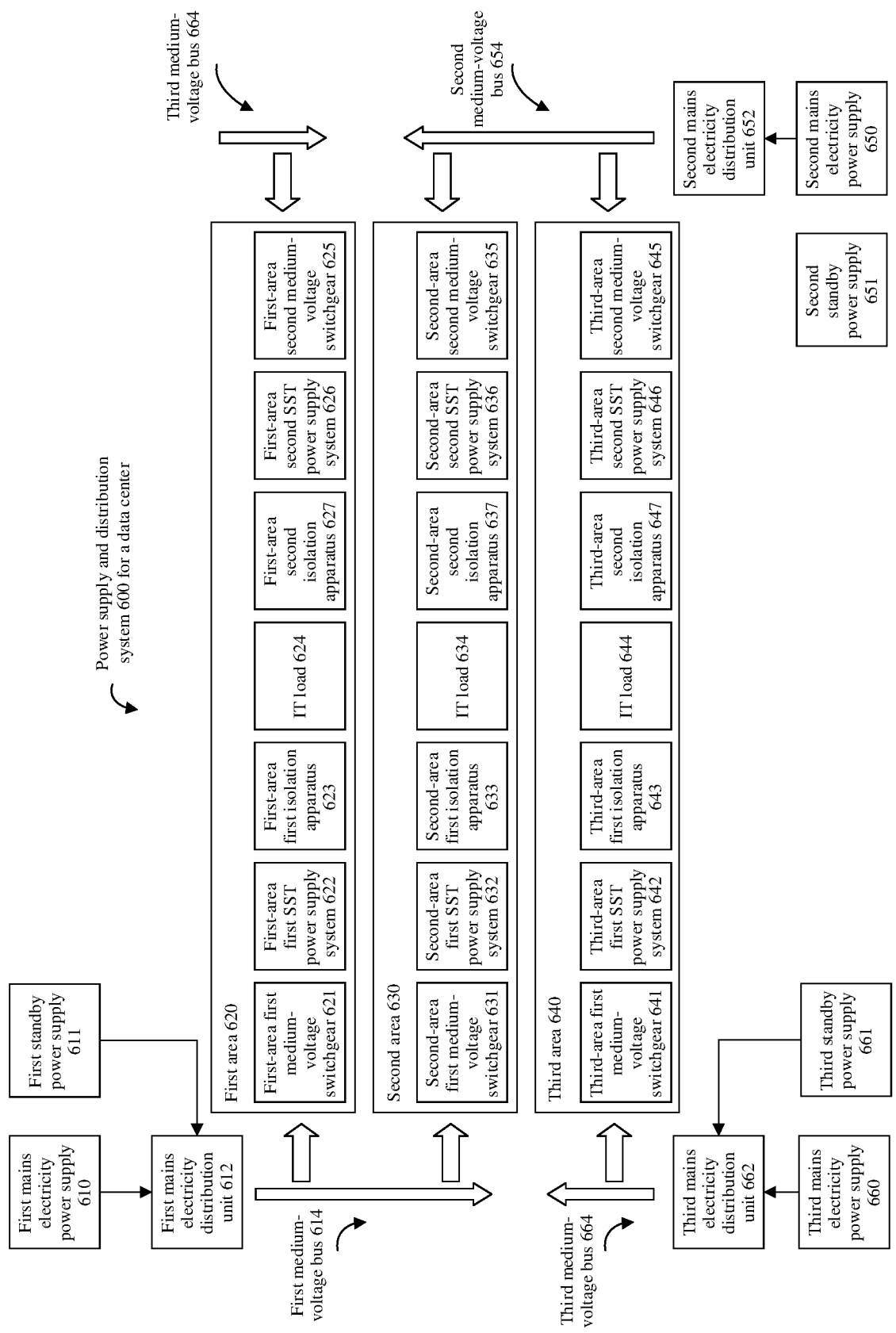
FIG. 6 is a block diagram of a power supply and distribution system for a data center in a third implementation according to an embodiment.

FIG. 6 is a block diagram of a power supply and distribution system for a data center in a third implementation according to an embodiment. As shown in FIG. 6, a power supply and distribution system 600 for a data center uses a distribution redundancy (DR) system architecture. The DR architecture shown in FIG. 6 includes three power supply and distribution units. The three power supply and distribution units operate simultaneously, and each supplies power to one load in a same group and one neighboring load. When the power supply and distribution system 600 for a data center is in normal operation, each power supply and distribution unit provides 66% of electric energy to the load in the same group and the neighboring load. When one of the power supply and distribution units becomes faulty, power supply for a load corresponding to the faulty power supply and distribution unit is continued by a neighboring power supply and distribution unit. The power supply and distribution system 600 for a data center based on the DR system architecture shown in FIG. 6 has three power supply and distribution units in total, which are a first power supply and distribution unit, a second power supply and distribution unit, and a third power supply and distribution unit, respectively. The first power supply and distribution unit of the power supply and distribution system 600 for a data center includes a first mains electricity power supply 610, a first standby power supply 611, a first mains electricity distribution unit 612, and a first medium-voltage bus 614. The first mains electricity power supply 610 and the first standby power supply 611 together provide an input to the first mains electricity distribution unit 612, where an output of the first mains electricity distribution unit 612 is connected to the first medium-voltage bus 614, and the first medium-voltage bus 614 is connected to the power supply and distribution system 600 for a data center and supplies distributed mains electricity. The second power supply and distribution unit of the power supply and distribution system 600 for a data center includes a second mains electricity power supply 650, a second standby power supply 651, a second mains electricity distribution unit 652, and a second medium-voltage bus 654. Relationships between the components of the second power supply and distribution unit of the power supply and distribution system 600 for a data center are similar to relationships in the first power supply and distribution unit. Details are not described herein again. The third power supply and distribution unit of the power supply and distribution system 600 for a data center includes a third mains electricity power supply 660, a third standby power supply 661, a third mains electricity distribution unit 662, and a third medium-voltage bus 664. Relationships between the components of the third power supply and distribution unit of the power supply and distribution system 600 for a data center are similar to relationships in the first power supply and distribution unit. Details are not described herein again.

Still referring to FIG. 6, the power supply and distribution system 600 for a data center includes various SST power supply systems and other devices distributed in three areas. In each area, there are two sets of SST power supply systems for connecting to the power supply and distribution units of the power supply and distribution system 600 for a data center with the DR system architecture. A first area 620 includes a first-area first medium-voltage switchgear 621, a first-area first SST power supply system 622, a first-area first isolation apparatus 623, and an IT load 624; and further includes a first-area second medium-voltage switchgear 625, a first-area second SST power supply system 626, and a first-area second isolation apparatus 627. A second area 630 includes a second-area first medium-voltage switchgear 631, a second-area first SST power supply system 632, a second-area first isolation apparatus 633, and an IT load 634; and further includes a second-area second medium-voltage switchgear 635, a second-area second SST power supply system 636, and a second-area second isolation apparatus 637. A third area 640 includes a third-area first medium-voltage switchgear 641, a third-area first SST power supply system 642, a third-area first isolation apparatus 643, and an IT load 644; and further includes a third-area second medium-voltage switchgear 645, a third-area second SST power supply system 646, and a third-area second isolation apparatus 647. The first-area first medium-voltage switchgear 621 in the first area 620 and the second-area first medium-voltage switchgear 631 in the second area 630 each are connected to the first medium-voltage bus 614 and receive electric energy from the first power supply and distribution unit of the power supply and distribution system 600 for a data center. The second-area second medium-voltage switchgear 635 in the second area 630 and the third-area second medium-voltage switchgear 645 in the third area 640 each are connected to the second medium-voltage bus 654 and receive electric energy from the second power supply and distribution unit of the power supply and distribution system 600 for a data center. The first-area second medium-voltage switchgear 625 in the first area 620 and the third-area first medium-voltage switchgear 641 in the third area 640 each are connected to the third medium-voltage bus 664 and receive electric energy from the third power supply and distribution unit of the power supply and distribution system 600 for a data center. In this way, the power supply and distribution system 600 for a data center shown in FIG. 6 has three areas, each of which has two SST power supply systems. The three power supply and distribution units of the DR architecture each supply power to two of the SST power supply systems. It should be understood that correspondences between the power supply and distribution units and the SST power supply systems shown in FIG. 6 are only examples, and the power supply and distribution system 600 for a data center may alternatively be configured with other correspondences. In a possible implementation, the power supply and distribution system 600 for a data center may be configured to meet the following designs: The first-area first medium-voltage switchgear 621 in the first area 620 and the third-area first medium-voltage switchgear 641 in the third area 640 each are connected to the first medium-voltage bus 614, and receive electric energy from the first power supply and distribution unit of the power supply and distribution system 600 for a data center; the second-area second medium-voltage switchgear 635 in the second area 630 and the third-area second medium-voltage switchgear 645 in the third area 640 each are connected to the second medium-voltage bus 654, and receive electric energy from the second power supply and distribution unit of the power supply and distribution system 600 for a data center; and the first-area second medium-voltage switchgear 625 in the first area 620 and the second-area first medium-voltage switchgear 631 in the second area 630 each are connected to the third medium-voltage bus 664, and receive electric energy from the third power supply and distribution unit of the power supply and distribution system 600 for a data center. The power supply and distribution system 600 for a data center may alternatively be configured to meet other designs, provided that a basic concept meets basic requirements of the DR system architecture.

Still referring to FIG. 6, the components deployed in the first area 620 are used as an example. The first-area first medium-voltage switchgear 621 is connected to the first medium-voltage bus 614 and receives mains electricity distributed to the first area 620 from the first medium-voltage bus 614. Necessary instruments, automatic control apparatuses, motor magnetic switches, various alternating current contactors, and the like are disposed inside the first-area first medium-voltage switchgear 621, to implement functions of enabling/disabling, controlling, and protecting an electrical device in a process of receiving and distributing mains electricity. The first-area first medium-voltage switchgear 621 distributes the mains electricity to the corresponding first-area first SST power supply system 622. The first-area first SST power supply system 622 may be the SST power supply system 100 shown in FIG. 1, the SST power supply system 200 shown in FIG. 2, or the SST power supply system 300 shown in FIG. 3, or may be any appropriate variation or combination made based on the structures of the SST power supply systems shown in FIG. 1 to FIG. 3. This is not limited herein. It should be understood that depending on whether the first-area first SST power supply system 622 outputs an alternating current or a direct current, the corresponding IT load 624 in the first area should also be configured to be suitable for receiving an alternating current input or a direct current input. The first-area first isolation apparatus 623 is configured to isolate the first-area first SST power supply system 622 and the IT load 624. The first-area first isolation apparatus 623 may be an isolation cabinet or another type of apparatus having an isolation function. The IT load 624 may include any possible combination of IT cabinets or various types of IT devices (such as a computer, a server, a network device, and a storage device). It should be understood that the first-area first medium-voltage switchgear 621 and the first-area first SST power supply system 622 disposed in the first area 620 may be defined as a first power distribution zone of the first area 620 for receiving mains electricity to be distributed to the first area 620 for distribution. An area in which the IT load 624 is located may be defined as an IT zone of the first area 620, which refers to a physical space that provides functions and services such as centralized processing, storage, transmission, exchange, and management for various IT devices. The first-area first isolation apparatus 623 is configured to isolate the first power distribution zone from the IT zone. In this way, the first-area first medium-voltage switchgear 621 and the first-area first SST power supply system 622 in the first area 620 can independently receive mains electricity distributed by the first medium-voltage bus 614 and supply the mains electricity the IT load 624. Correspondingly, the first-area second medium-voltage switchgear 625 is connected to the third medium-voltage bus 664 and receives mains electricity distributed to the first area 620 from the third medium-voltage bus 664. Necessary instruments, automatic control apparatuses, motor magnetic switches, various alternating current contactors, and the like are disposed inside the first-area second medium-voltage switchgear 625, to implement functions of enabling/disabling, controlling, and protecting an electrical device in a process of receiving and distributing mains electricity. The first-area second medium-voltage switchgear 625 distributes the mains electricity to the corresponding first-area second SST power supply system 626. The first-area second SST power supply system 626 may be the SST power supply system 100 shown in FIG. 1, the SST power supply system 200 shown in FIG. 2, or the SST power supply system 300 shown in FIG. 3, or may be any appropriate variation or combination made based on the structures of the SST power supply systems shown in FIG. 1 to FIG. 3. This is not limited herein. It should be understood that depending on whether the first-area second SST power supply system 626 outputs an alternating current or a direct current, the corresponding IT load 624 in the first area should also be configured to be suitable for receiving an alternating current input or a direct current input. The first-area second isolation apparatus 627 is configured to isolate the first-area second SST power supply system 626 and the IT load 624. The first-area second isolation apparatus 627 may be an isolation cabinet or another type of apparatus having an isolation function. The IT load 624 may include any possible combination of IT cabinets or various types of IT devices (such as a computer, a server, a network device, and a storage device). It should be understood that the first-area second medium-voltage switchgear 625 and the first-area second SST power supply system 626 disposed in the first area 620 may be defined as a second power distribution zone of the first area 620 for receiving mains electricity to be distributed to the first area 620 for distribution. The first-area second isolation apparatus 627 is configured to isolate the second power distribution zone from the IT zone. In this way, the first-area second medium-voltage switchgear 625 and the first-area second SST power supply system 626 in the first area 620 can independently receive mains electricity distributed by the second medium-voltage bus 654 and supply the mains electricity the IT load 624. It should be understood that the first-area first SST power supply system 622 in the first area 620 and the first-area second SST power supply system 626 should both output direct currents or alternating currents, to distribute the currents to the corresponding IT load 624.

Still referring to FIG. 6, first area 620 has the first power distribution zone (which corresponds to the first-area first SST power supply system 622) and the second power distribution zone (which corresponds to the first-area second SST power supply system 626) that are independent of each other, for respectively receiving and distributing the mains electric energy provided by the first power supply and distribution unit and the third power supply and distribution unit of the power supply and distribution system 600 for a data center with the DR system architecture. Similarly, the second area 630 has the first power distribution zone (which corresponds to the second-area first SST power supply system 632) and the second power distribution zone (which corresponds to the second-area second SST power supply system 636) that are independent of each other, for respectively receiving and distributing the mains electric energy provided by the first power supply and distribution unit and the second power supply and distribution unit of the power supply and distribution system 600 for a data center with the DR system architecture. The third area 640 has the first power distribution zone (which corresponds to the third-area first SST power supply system 642) and the second power distribution zone (which corresponds to the third-area second SST power supply system 646) that are independent of each other, for respectively receiving and distributing the mains electric energy provided by the third power supply and distribution unit and the second power supply and distribution unit of the power supply and distribution system 600 for a data center with the DR system architecture. It should be understood that the first power distribution zone and the second power distribution zone in each of the first area 620, the second area 630, and the third area 640 may alternatively be configured into a combination corresponding to a different power supply and distribution unit, provided that a basic concept meets the basic requirements of the DR system architecture. It should be understood that the first area 620 may be understood as a specific floor in a building with a plurality of floors, and the components located in the first area 620 are all located on the same floor. The first area 620 may alternatively be understood as a complete area obtained through division in a physical space on a same plane, for example, a compartment in a planar layer structure including a plurality of compartments. The first area 620, the second area 630, and the third area 640 are three areas that are independent of each other, and may be understood as different floors in a building with a plurality of floors, or may be understood as different areas in a physical space on a same plane. In some example embodiments, the first area 620 and the second area 630 may be different areas of a space located on a same floor, while the third area 640 is located on a different floor from the first area 620 and the second area 630.

Referring to FIG. 6, details of the components disposed in the second area 630 and relationships in between are similar to details of the components disposed in the first area 620 and relationships in between. Details are not described herein again. Details of the components disposed in the third area 640 and relationships in between are similar to the details of the components disposed in the first area 620 and the relationships in between. Details are not described herein again. It should be understood that the first medium-voltage bus 614 is connected to each of the first-area first medium-voltage switchgear 621 deployed in the first area 620 and the second-area first medium-voltage switchgear 631 deployed in the second area 630; and supplies mains electricity for distribution. Through a switching operation of the respective medium-voltage switchgear, each area can independently receive and distribute the mains electricity from the first medium-voltage bus 614. The second medium-voltage bus 654 is connected to each of the first-area second medium-voltage switchgear 625 deployed in the second area 630 and the third-area second medium-voltage switchgear 645 deployed in the third area 640; and supplies mains electricity for distribution. Through a switching operation of the respective medium-voltage switchgear, each area can independently receive and distribute the mains electricity from the second medium-voltage bus 654. The third medium-voltage bus 664 is connected to each of the first-area second medium-voltage switchgear 625 deployed in the first area 620 and the third-area first medium-voltage switchgear 641 deployed in the third area 640; and supplies mains electricity for distribution. Through a switching operation of the respective medium-voltage switchgear, each area can independently receive and distribute the mains electricity from the third medium-voltage bus 664. The three areas 620, 630, and 640 shown in FIG. 6 are used as examples only, and in some example embodiments, the power supply and distribution system 600 for a data center may have another quantity of areas. For example, the power supply and distribution system 600 for a data center may have N areas, where N is a positive integer greater than or equal to 1, and each of the N areas is deployed with two respective sets of medium-voltage switchgears, SST power supply systems, isolation apparatuses for connecting to two different power supply and distribution units, and IT loads. Details of the components in each of the N areas and relationships in between are similar to the foregoing details of the components in the first area 620 and the relationships in between.

Still referring to FIG. 6, a voltage of distributed mains electricity is reduced through the SST power supply system in each area, so that there is no need to use a low frequency transformer for voltage reduction and no need to dispose the low frequency transformer and a corresponding low-voltage power distribution cabinet in a centralized manner. Therefore, each SST power supply system may be deployed near a corresponding IT load, that is, deployed in a same area as the corresponding IT load. This helps reduce an occupied space, a length of a low-voltage bus, a loss, and costs. In addition, each SST power supply system does not need to reduce the voltage of the alternating-current mains electricity through the low frequency transformer, but directly converts the alternating-current mains electricity into a direct current, which is used, together with a direct current output of an energy storage apparatus, as an input of an inverter module or an output of the SST power supply system. This reduces a quantity of required devices and simplifies a link. In this way, independent operation of power distribution for the IT load in each area is implemented through the medium-voltage switchgear in each area, facilitating intelligent electric energy distribution; and isolation between a power distribution zone and an IT zone in each area is implemented through the isolation apparatus in each area, improving safety. In addition, through simultaneous supply of electric energy to each IT load by the plurality of power supply and distribution units of the power supply and distribution system 600 for a data center with the DR system architecture, it is also possible to avoid a system shutdown loss caused by a faulty power supply and distribution unit.

Figure 7:
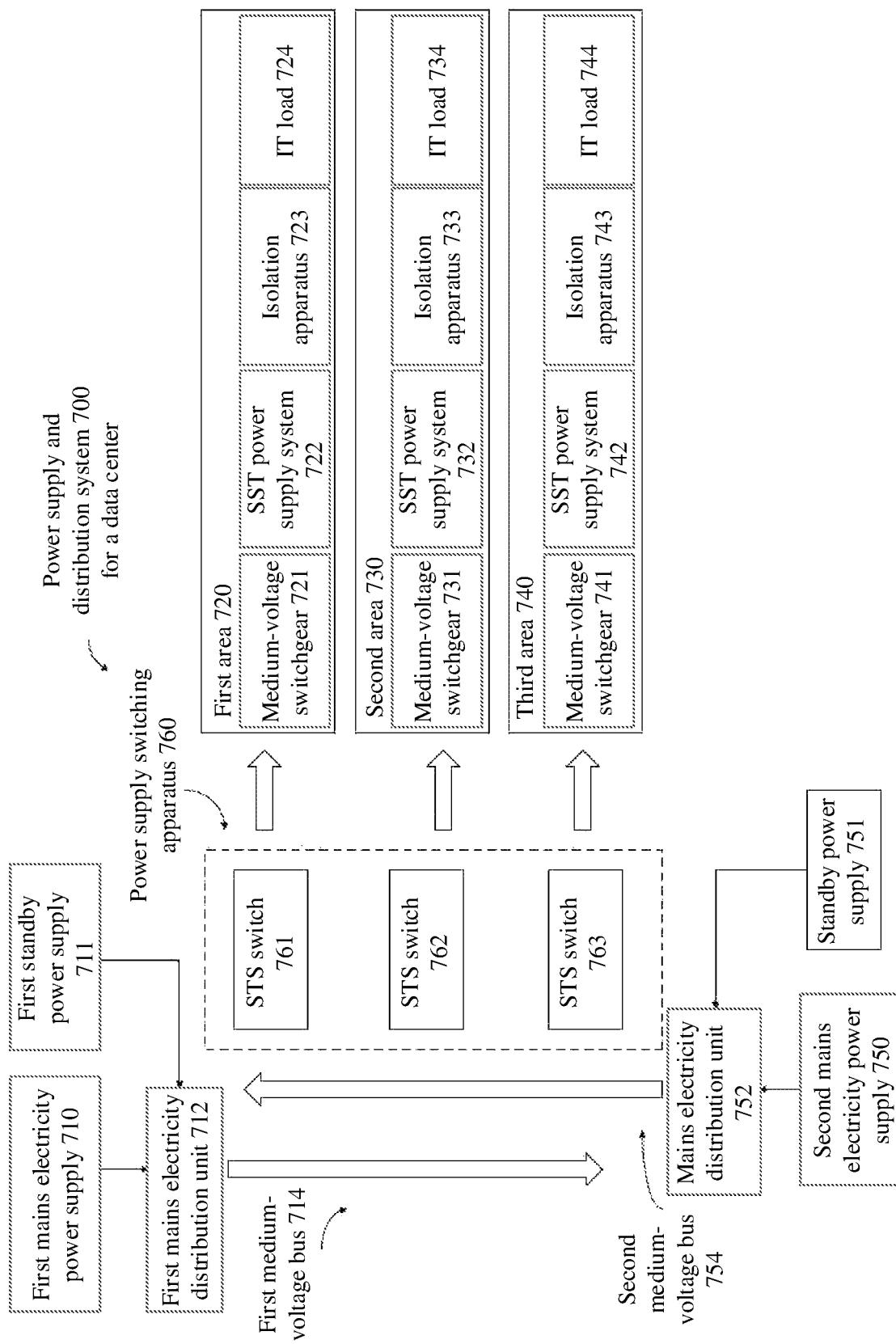
FIG. 7 is a block diagram of a power supply and distribution system for a data center in a fourth implementation according to an embodiment.

FIG. 7 is a block diagram of a power supply and distribution system for a data center in a fourth implementation according to an embodiment. As shown in FIG. 7, a power supply and distribution system 700 for a data center uses a reserve redundancy (RR) system architecture. The RR architecture shown in FIG. 7 includes two power supply and distribution units, one of which is used as a standby for the other. When a power supply and distribution unit in operation becomes faulty, power supply is continued by the standby power supply and distribution unit through a power supply switching apparatus. The power supply and distribution system 700 for a data center based on the RR system architecture shown in FIG. 7 has two power supply and distribution units in total, which are a first power supply and distribution unit and a second power supply and distribution unit, respectively. The first power supply and distribution unit of the power supply and distribution system 700 for a data center includes a first mains electricity power supply 710, a first standby power supply 711, a first mains electricity distribution unit 712, and a first medium-voltage bus 714. The first mains electricity power supply 710 and the first standby power supply 711 together provide an input to the first mains electricity distribution unit 712, where an output of the first mains electricity distribution unit 712 is connected to the first medium-voltage bus 714, and the first medium-voltage bus 714 is connected to the power supply and distribution system 700 for a data center and supplies distributed mains electricity. The second power supply and distribution unit of the power supply and distribution system 700 for a data center includes a second mains electricity power supply 750, a second standby power supply 751, a second mains electricity distribution unit 752, and a second medium-voltage bus 754. Relationships between the components of the second power supply and distribution unit of the power supply and distribution system 700 for a data center are similar to relationships in the first power supply and distribution unit. Details are not described herein again. The RR architecture shown in FIG. 7 further includes a power supply switching apparatus 760 for switching between the first power supply and distribution unit and the second power supply and distribution unit. The power supply switching apparatus 760 includes a plurality of static transfer switches (STS): an STS switch 761, an STS switch 762, and an STS switch 763. The power supply switching apparatus 760 is disposed between the power supply and distribution system 700 for a data center and both the first medium-voltage bus 714 and the second medium-voltage bus 754, and is configured to switch between power supply and distribution units that supply power to the power supply and distribution system 700 for a data center.

Still referring to FIG. 7, the power supply and distribution system 700 for a data center includes various SST power supply systems and other devices distributed in three areas. A medium-voltage switchgear 721, an SST power supply system 722, an isolation apparatus 723, and an IT load 724 are deployed in a first area 720; a medium-voltage switchgear 731, an SST power supply system 732, an isolation apparatus 733, and an IT load 734 are deployed in a second area 730; and a medium-voltage switchgear 741, an SST power supply system 742, an isolation apparatus 743, and an IT load 744 are deployed in a third area 740. Using the SST power supply system 722 deployed in the first area 720 as an example, the medium-voltage switchgear 721 is connected to the STS switch 761 and receives mains electricity distributed to the first area 720. Necessary instruments, automatic control apparatuses, motor magnetic switches, various alternating current contactors, and the like are disposed inside the medium-voltage switchgear 721, to implement functions of enabling/disabling, controlling, and protecting an electrical device in a process of receiving and distributing mains electricity. The medium-voltage switchgear 721 distributes the mains electricity to the corresponding SST power supply system 722. The SST power supply system 722 may be the SST power supply system 100 shown in FIG. 1, the SST power supply system 200 shown in FIG. 2, or the SST power supply system 300 shown in FIG. 3, or may be any appropriate variation or combination made based on the structures of the SST power supply systems shown in FIG. 1 to FIG. 3. This is not limited herein. It should be understood that depending on whether the SST power supply system 722 outputs an alternating current or a direct current, the corresponding IT load 724 in the first area should also be configured to be suitable for receiving an alternating current input or a direct current input. The isolation apparatus 723 is configured to isolate the SST power supply system 722 and the IT load 724. The isolation apparatus 723 may be an isolation cabinet or another type of apparatus having an isolation function. The IT load 724 may include any possible combination of IT cabinets or various types of IT devices (such as a computer, a server, a network device, and a storage device). It should be understood that the medium-voltage switchgear 721 and the SST power supply system 722 disposed in the first area 720 may be defined as a power distribution zone of the first area 720 for receiving mains electricity to be distributed to the first area 720 for distribution. An area in which the IT load 724 is located may be defined as an IT zone of the first area 720, which refers to a physical space that provides functions and services such as centralized processing, storage, transmission, exchange, and management for various IT devices. The isolation apparatus 723 is configured to isolate the power distribution zone from the IT zone. It should be understood that the first area 720 may be understood as a specific floor in a building with a plurality of floors, and the medium-voltage switchgear 721, the SST power supply system 722, the isolation apparatus 723, and the IT load 724 located in the first area 720 are all located on the same floor. The first area 720 may alternatively be understood as a complete area obtained through division in a physical space on a same plane, for example, a compartment in a planar layer structure including a plurality of compartments. The first area 720, the second area 730, and the third area 740 are three areas that are independent of each other, and may be understood as different floors in a building with a plurality of floors, or may be understood as different areas in a physical space on a same plane. In some example embodiments, the first area 720 and the second area 730 may be different areas of a space located on a same floor, while the third area 740 is located on a different floor from the first area 720 and the second area 730.

Referring to FIG. 7, details of the SST power supply system 732 and other components disposed in the second area 730 and relationships in between are similar to details of the SST power supply system 722 and other components disposed in the first area 720 and relationships in between. Details are not described herein again. Details of the SST power supply system 742 and other components disposed in the third area 740 and relationships in between are similar to the details of the SST power supply system 722 and other components disposed in the first area 720 and the relationships in between. Details are not described herein again. It should be understood that the medium-voltage switchgear 721 deployed in the first area 720, the medium-voltage switchgear 731 deployed in the second area 730, and the medium-voltage switchgear 741 deployed in the third area 740 are respectively connected to the STS switch 761, the STS switch 762, and the STS switch 763 in the power supply switching apparatus 760; and receives respective distributed mains electricity. The STS switch 761, the STS switch 762, and the STS switch 763 can switch between the first medium-voltage bus 714 and the second medium-voltage bus 754 to select different power supply and distribution units to provide electric energy. In addition, through a switching operation of the respective medium-voltage switchgear, each area can independently receive and distribute the mains electricity. The three areas 720, 730, and 740 shown in FIG. 7 are used as examples only, and in some example embodiments, the power supply and distribution system 700 for a data center may have another quantity of areas. For example, the power supply and distribution system 700 for a data center may have N areas, where N is a positive integer greater than or equal to 1, and the N areas are deployed with respective medium-voltage switchgears, SST power supply systems, isolation apparatuses, and IT loads. Details of the SST power supply system and other components in each of the N areas and relationships in between are similar to the foregoing details of the SST power supply system 422 and other components in the first area 720 and the relationships in between. Correspondingly, the power supply switching apparatus 760 may be configured with N STS switches, and the N STS switches are in a one-to-one correspondence with the N areas. In addition, it should be understood that the two power supply and distribution units included in the RR system architecture shown FIG. 7 are only examples. The power supply and distribution system 700 for a data center may alternatively include three or more power supply and distribution units. The power supply switching apparatus 760 is configured to switch between the three or more power supply and distribution units, so that the power supply switching apparatus 760 can switch to a standby power supply and distribution unit when a power supply and distribution unit in operation becomes faulty.

Still referring to FIG. 7, a voltage of distributed mains electricity is reduced through the SST power supply system in each area, so that there is no need to use a low frequency transformer for voltage reduction and no need to dispose the low frequency transformer and a corresponding low-voltage power distribution cabinet in a centralized manner. Therefore, each SST power supply system may be deployed near a corresponding IT load, that is, deployed in a same area as the corresponding IT load. This helps reduce an occupied space, a length of a low-voltage bus, a loss, and costs. In addition, each SST power supply system does not need to reduce a voltage of the alternating-current mains electricity through the low frequency transformer, but directly converts the alternating-current mains electricity into a direct current, which is used, together with a direct current output of an energy storage apparatus, as an input of an inverter module or an output of the SST power supply system. This reduces a quantity of required devices and simplifies a link. In this way, independent operation of power distribution for the IT load in each area is implemented through the medium-voltage switchgear in each area, facilitating intelligent electric energy distribution; and isolation between a power distribution zone and an IT zone in each area is implemented through the isolation apparatus in each area, improving safety. In addition, the power supply switching apparatus 760 and the RR system architecture can enable switching to a standby power supply and distribution unit when a power supply and distribution unit in operation becomes faulty, thereby avoiding a system shutdown loss caused by the faulty power supply and distribution unit.

Figure 8:
FIG. 8 shows a first combination of IT loads in a power supply and distribution system for a data center according to an embodiment.

FIG. 8 shows a first combination of IT loads in a power supply and distribution system for a data center according to an embodiment. As shown in FIG. 8, a medium-voltage switchgear 821, an SST power supply system 822, an isolation apparatus 823, and a first-area IT micro module 824 are deployed in a first area 820; a medium-voltage switchgear 831, an SST power supply system 832, an isolation apparatus 833, a second-area IT micro module 834, a second-area IT micro module 835, and a second-area IT micro module 836 are deployed in a second area 830; and a medium-voltage switchgear 841, an SST power supply system 842, an isolation apparatus 843, a third-area IT micro module 844, and a third-area IT micro module 845 are deployed in a third area 840. It should be understood that the IT micro module refers to a modular architecture with a highly integrated design in a smart modular data center solution, and is configured to integrate all subsystems such as a cabinet subsystem, a power supply and distribution subsystem, a cooling subsystem, a wiring subsystem, and a management subsystem. For example, the IT micro module may be a configuration including modular IT cabinets, air conditioning components, power distribution components, and other standardized components, and the specific configuration of the IT micro module may be flexibly adjusted to meet requirements of data centers for various scales and various services. This is also conducive to expansion or adjustment of the data centers. As shown in FIG. 8, the first area 820 includes only one IT micro module: the first-area IT micro module 824; the second area 830 includes three IT micro modules: the second-area IT micro module 834, the second-area IT micro module 835, and the second-area IT micro module 836; and the third area 840 includes two IT micro modules: the third-area IT micro module 844 and the third-area IT micro module 845. It should be understood that the plurality of IT micro modules shown in FIG. 8 may have a same configuration or may have different configurations to address specific needs of different areas. A quantity of IT micro modules corresponding to each SST power supply system shown in FIG. 8 is merely an example. In some example embodiments, there may be different quantities of IT micro modules. For example, a single SST power supply system may correspond to four or more IT micro modules.

A first combination of IT loads of the power supply and distribution system for a data center shown in FIG. 8 may correspond to any one of the combinations of IT loads in FIG. 4 to FIG. 7. It should be understood that a voltage of distributed mains electricity is reduced through the SST power supply system in each area, so that there is no need to use a low frequency transformer for voltage reduction and no need to dispose the low frequency transformer and a corresponding low-voltage power distribution cabinet in a centralized manner. Therefore, each SST power supply system may be deployed near an IT load in an area in which the SST power supply system is located, that is, deployed in a same area as the corresponding IT load. This helps reduce an occupied space, a length of a low-voltage bus, a loss, and costs. In addition, because the SST power supply system in each area directly obtains electric energy through mains electricity distribution by using the respective medium-voltage switchgear, the SST power supply system in each area may be designed differently based on a status of the respective IT load. This is conducive to flexible configuration to meet requirements of different areas. For example, the SST power supply system 822 in the first area 820 may be designed to output a 220 Vac alternating current, and the IT load in the first area, for example, the first-area IT micro module 824, may be designed to be suitable for receiving an alternating current input; the SST power supply system 832 in the second area 830 may be designed to output a 400 Vdc direct current, and the IT loads in the second area, for example, the second-area IT micro module 834, the second-area IT micro module 835, and the second-area IT micro module 836 may be designed to be suitable for receiving a direct current input. For example, mains electricity may be converted into an alternating current according to the requirement of the first area 820, and mains electricity may be converted into a direct current according to the requirement of the second area 830. This presents a more flexible power supply configuration than a centralized power supply and distribution mode. In addition, if the structure of the SST system shown in FIG. 3 is used, the SST power supply system may be selectively switched to an output of an alternating current or a direct current. This facilitates flexible configuration according to an actual requirement.

Figure 9:
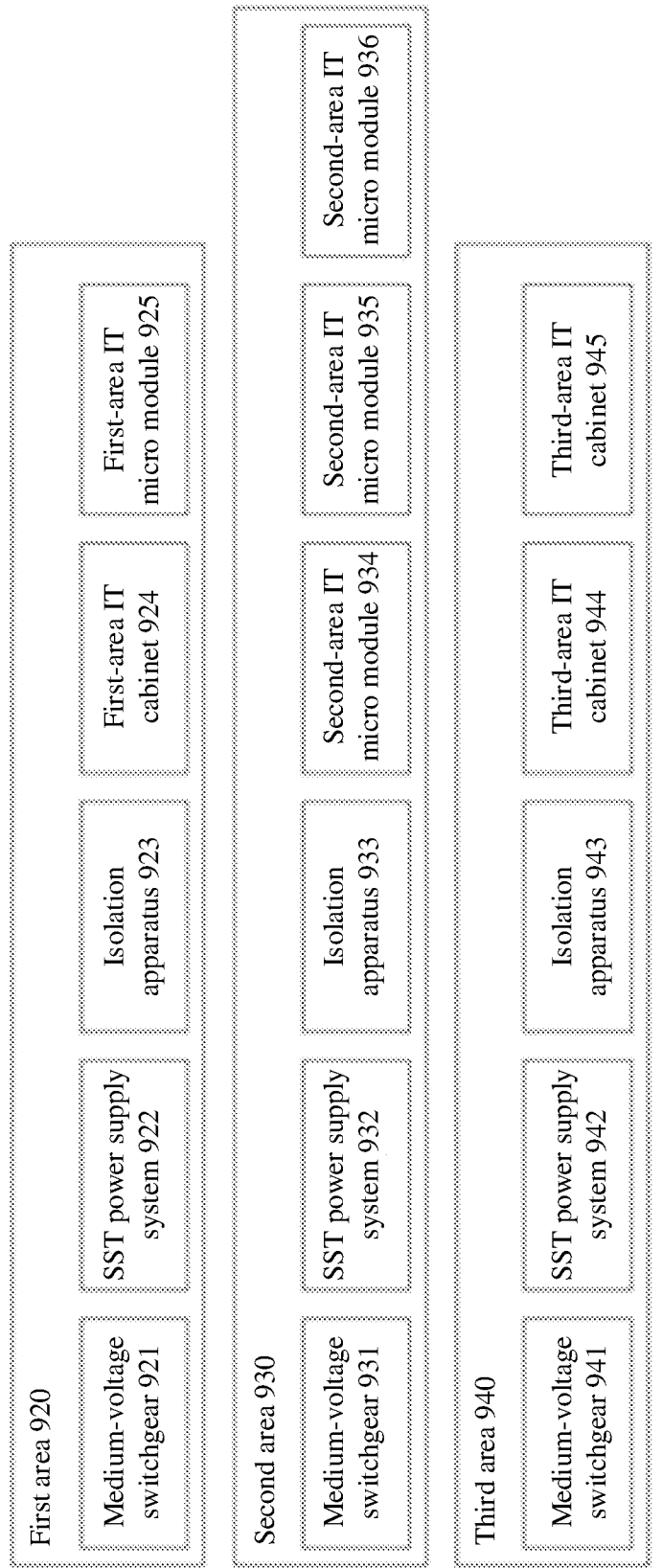
FIG. 9 shows a second combination of IT loads in a power supply and distribution system for a data center according to an embodiment.

FIG. 9 shows a second combination of IT loads in a power supply and distribution system for a data center according to an embodiment. As shown in FIG. 9, a medium-voltage switchgear 921, an SST power supply system 922, an isolation apparatus 923, a first-area IT cabinet 924, and a first-area IT micro module 925 are deployed in a first area 920; a medium-voltage switchgear 931, an SST power supply system 932, an isolation apparatus 933, a second-area IT micro module 934, a second-area IT micro module 935, and a second-area IT micro module 936 are deployed in a second area 930; and a medium-voltage switchgear 941, an SST power supply system 942, an isolation apparatus 943, a third-area IT cabinet 944, and a third-area IT cabinet 945 are deployed in a third area 940. It should be understood that the IT micro module refers to a modular architecture with a highly integrated design in a smart modular data center solution, and is configured to integrate all subsystems such as a cabinet subsystem, a power supply and distribution subsystem, a cooling subsystem, a wiring subsystem, and a management subsystem. For example, the IT micro module may be a configuration including modular IT cabinets, air conditioning components, power distribution components, and other standardized components, and the specific configuration of the IT micro module may be flexibly adjusted to meet requirements of data centers for various scales and various services. This is also conducive to expansion or adjustment of the data centers. The IT cabinet is a stand-alone or self-supporting enclosure used in the data centers for accommodating electrical or electronic devices. IT loads in the first area 920 shown in FIG. 9 include one IT cabinet and one IT micro module; IT loads in the second area 930 include three IT micro modules; and IT loads in the third area 940 include two IT cabinets. As shown in FIG. 9, the IT loads in each area may have different kinds of combinations, such as a combination including only IT micro modules, a combination including only IT cabinets, or a combination including both an IT cabinet and an IT load. It should be understood that the possible combinations of IT loads shown in FIG. 9 are merely examples, and varied quantities and types may be used for different combinations. For example, the first area 920 may alternatively include more IT micro modules or include other types of IT loads such as a memory and a network device. Configurations and combinations of IT loads in each area may vary according to actual needs.

A second combination of IT loads of the power supply and distribution system for a data center shown in FIG. 9 may correspond to any one of the combinations of IT loads in FIG. 4 to FIG. 7. It should be understood that a voltage of distributed mains electricity is reduced through the SST power supply system in each area, so that there is no need to use a low frequency transformer for voltage reduction and no need to dispose the low frequency transformer and a corresponding low-voltage power distribution cabinet in a centralized manner. Therefore, each SST power supply system may be deployed near an IT load in an area in which the SST power supply system is located, that is, deployed in a same area as the corresponding IT load. This helps reduce an occupied space, a length of a low-voltage bus, a loss, and costs. In addition, because the SST power supply system in each area directly obtains electric energy through mains electricity distribution by using the respective medium-voltage switchgear, the SST power supply system in each area may be designed differently based on a status of the respective IT load. This is conducive to flexible configuration to meet requirements of different areas. For example, the SST power supply system 922 in the first area 920 may be designed to output a 220 Vac alternating current, and the IT load in the first area may be configured to be suitable for receiving an alternating current input; and the SST power supply system 932 in the second area 930 may be designed to output a 400 Vdc direct current, and the IT load in the second area may be configured to be suitable for receiving a direct current input. For example, mains electricity may be converted into an alternating current according to the requirement of the first area 920, and mains electricity may be converted into a direct current according to the requirement of the second area 930. This presents a more flexible power supply configuration than a centralized power supply and distribution mode. In addition, if the structure of the SST system shown in FIG. 3 is used, the SST power supply system may be selectively switched to an output of an alternating current or a direct current. This facilitates flexible configuration according to an actual requirement.

The foregoing describes the implementations of various embodiments. It should be noted that, according to an actual need, the steps in the method described in the embodiments may be combined or deleted, and the order of the steps may be adjusted. In the foregoing embodiments, the description of each embodiment has respective focuses. For a part that is not described in detail in an embodiment, refer to related description in other embodiments. It should be understood that embodiments and the structures shown in the accompanying drawings do not constitute a specific limitation on a related apparatus or system. In some other embodiments, a related apparatus or system may include more or fewer components than those in the specific embodiments and accompanying drawings; or some components may be combined or split, or there may be a different arrangement of components. A person skilled in the art should understand that, various modifications or variations may be made to the arrangements, operations, and details of the method and device described in specific embodiments without departing from the spirit and scope of embodiments; several improvements and modifications may also be made without departing from the principle of the embodiments, and the improvements and modifications shall fall within the scope of the embodiments.

What is claimed is:

1. A power supply and distribution system for a data center, the power supply and distribution system for a data center comprising:
  a plurality of solid state transformer (SST) power supply systems, wherein
  each of the plurality of SST power supply systems comprises a rectifier module that performs voltage reduction and rectification by using an SST and an energy storage apparatus connected to the rectifier module;
  an inverter module for inverting a direct current output of the rectifier module and a direct current output of the energy storage apparatus; and
  a bypass apparatus that is connected in parallel to the inverter module and then connected to the direct current output side of the energy storage apparatus and the direct current output side of the rectifier module, and the bypass apparatus is configured to bypass the inverter module;
  the plurality of SST power supply systems are in a one-to-one correspondence with a plurality of cabinet units, and each of the plurality of cabinet units is configured to deploy an SST power supply system corresponding to the cabinet unit;
  the rectifier module in each of the plurality of SST power supply systems receives electric energy through a medium-voltage bus; and
  the plurality of SST power supply systems supply power to a plurality of IT loads, the plurality of IT loads are in a one-to-one correspondence with the plurality of SST power supply systems, and each of the plurality of IT loads is located in a same area as a cabinet unit at which an SST power supply system corresponding to the IT load is located.

2. The power supply and distribution system for a data center according to claim 1, wherein the plurality of SST power supply systems are in a one-to-one correspondence with a plurality of isolation apparatuses, and each of the plurality of isolation apparatuses is configured to isolate a cabinet unit at which an SST power supply system corresponding to the isolation apparatus is located and an IT load that corresponds to the SST power supply system corresponding to the isolation apparatus.

3. The power supply and distribution system for a data center according to claim 1, wherein the power supply and distribution system for a data center further comprises:
a plurality of medium-voltage switchgears, wherein the plurality of medium-voltage switchgears are in a one-to-one correspondence with the plurality of SST power supply systems, and each of the plurality of medium-voltage switchgears is configured to control alternating current transmission between the medium-voltage bus and an SST power supply system corresponding to the medium-voltage switchgear.

4. The power supply and distribution system for a data center according to claim 1, wherein the plurality of SST power supply systems are in a one-to-one correspondence with a plurality of isolation apparatuses, and each of the plurality of isolation apparatuses is configured to isolate a cabinet unit at which an SST power supply system corresponding to the isolation apparatus is located and an IT load that corresponds to the SST power supply system corresponding to the isolation apparatus.

5. The power supply and distribution system for a data center according to claim 1, wherein the power supply and distribution system for a data center further comprises:
a plurality of medium-voltage switchgears, wherein the plurality of medium-voltage switchgears are in a one-to-one correspondence with the plurality of SST power supply systems, and each of the plurality of medium-voltage switchgears is configured to control alternating current transmission between the medium-voltage bus and an SST power supply system corresponding to the medium-voltage switchgear.

6. A power supply and distribution system for a data center, the power supply and distribution system comprising:
a plurality of first solid state transformer (SST) power supply systems, wherein each of the plurality of first SST power supply systems comprises a rectifier module that performs voltage reduction and rectification by using an SST and an energy storage apparatus connected to the rectifier module, the plurality of first SST power supply systems are in a one-to-one correspondence with a plurality of first cabinet units, each of the plurality of first cabinet units is configured to deploy a first SST power supply system corresponding to the first cabinet unit, and the plurality of first SST power supply systems each receive electric energy through a first medium-voltage bus; and
a plurality of second SST power supply systems, wherein the plurality of second SST power supply systems are in a one-to-one correspondence with the plurality of first SST power supply systems, a type of electric power output by each of the plurality of second SST power supply systems is the same as a type of electric power output by a first SST power supply system corresponding to the second SST power supply system, the plurality of second SST power supply systems are in a one-to-one correspondence with a plurality of second cabinet units, each of the plurality of second cabinet units is configured to deploy a second SST power supply system corresponding to the second cabinet unit, each of the plurality of second cabinet units is located in a same area as a first cabinet unit at which a first SST power supply system that corresponds to a second SST power supply system corresponding to the second cabinet unit is located, and the plurality of second SST power supply systems each receive electric energy through a second medium-voltage bus, wherein
the plurality of first SST power supply systems are in a one-to-one correspondence with a plurality of IT loads, and each of the plurality of IT loads is located in a same area as a first cabinet unit at which a first SST power supply system corresponding to the IT load is located;
each of the plurality of first SST power supply systems further comprises:
an inverter module for inverting a direct current output of the rectifier module and a direct current output of the energy storage apparatus, and each of the plurality of second SST power supply systems outputs an alternating current
and
a bypass apparatus that is connected in parallel to the inverter module and then connected to the direct current output side of the energy storage apparatus and the direct current output side of the rectifier module, and the bypass apparatus is configured to bypass the inverter module.

7. The power supply and distribution system for a data center according to claim 6, wherein the plurality of first SST power supply systems are in a one-to-one correspondence with a plurality of first isolation apparatuses, and each of the plurality of first isolation apparatuses is configured to isolate a first cabinet unit at which a first SST power supply system corresponding to the first isolation apparatus is located and an IT load that corresponds to the first SST power supply system corresponding to the first isolation apparatus.

8. The power supply and distribution system for a data center according to claim 6, wherein the power supply and distribution system for a data center further comprises:
a plurality of first medium-voltage switchgears, wherein the plurality of first medium-voltage switchgears are in a one-to-one correspondence with the plurality of first SST power supply systems, and each of the plurality of first medium-voltage switchgears is configured to control alternating current transmission between the first medium-voltage bus and a first SST power supply system corresponding to the first medium-voltage switchgear.

9. The power supply and distribution system for a data center according to claim 6, wherein the plurality of second SST power supply systems are in a one-to-one correspondence with a plurality of second isolation apparatuses, and each of the plurality of second isolation apparatuses is configured to isolate a second cabinet unit at which a second SST power supply system corresponding to the second isolation apparatus is located and an IT load that corresponds to the second SST power supply system corresponding to the second isolation apparatus.

10. The power supply and distribution system for a data center according to claim 6, wherein the power supply and distribution system for a data center further comprises:
a plurality of second medium-voltage switchgears, wherein the plurality of second medium-voltage switchgears are in a one-to-one correspondence with the plurality of second SST power supply systems, and each of the plurality of second medium-voltage switchgears is configured to control alternating current transmission between the second medium-voltage bus and a second SST power supply system corresponding to the second medium-voltage switchgear.

11. The power supply and distribution system for a data center according to claim 6, wherein the plurality of first SST power supply systems are in a one-to-one correspondence with a plurality of first isolation apparatuses, and each of the plurality of first isolation apparatuses is configured to isolate a first cabinet unit at which a first SST power supply system corresponding to the first isolation apparatus is located and an IT load that corresponds to the first SST power supply system corresponding to the first isolation apparatus.

12. The power supply and distribution system for a data center according to claim 6, wherein the power supply and distribution system for a data center further comprises: a plurality of first medium-voltage switchgears, wherein the plurality of first medium-voltage switchgears are in a one-to-one correspondence with the plurality of first SST power supply systems, and each of the plurality of first medium-voltage switchgears is configured to control alternating current transmission between the first medium-voltage bus and a first SST power supply system corresponding to the first medium-voltage switchgear.

13. The power supply and distribution system for a data center according to claim 6, wherein the plurality of second SST power supply systems are in a one-to-one correspondence with a plurality of second isolation apparatuses, and each of the plurality of second isolation apparatuses is configured to isolate a second cabinet unit at which a second SST power supply system corresponding to the second isolation apparatus is located and an IT load that corresponds to the second SST power supply system corresponding to the second isolation apparatus.

14. The power supply and distribution system for a data center according to claim 6, wherein the power supply and distribution system for a data center further comprises: a plurality of second medium-voltage switchgears, wherein the plurality of second medium-voltage switchgears are in a one-to-one correspondence with the plurality of second SST power supply systems, and each of the plurality of second medium-voltage switchgears is configured to control alternating current transmission between the second medium-voltage bus and a second SST power supply system corresponding to the second medium-voltage switchgear.

15. A power supply and distribution system for a data center, wherein the power supply and distribution system for a data center comprises a plurality of areas, each of the plurality of areas is configured with an SST power supply system, the SST power supply system comprises:
    a rectifier module that performs voltage reduction and rectification by using an SST and an energy storage apparatus connected to the rectifier module;
    an inverter module for inverting a direct current output of the rectifier module and a direct current output of the energy storage apparatus; and
    a bypass apparatus that is connected in parallel to the inverter module and then connected to the direct current output side of the energy storage apparatus and the direct current output side of the rectifier module, and the bypass apparatus is configured to bypass the inverter module;
    each of the plurality of areas is further configured with an IT load, and the IT load obtains electric energy through an SST power supply system located in the same area; and
    wherein the SST power supply system further comprises an inverter module for inverting a direct current output of the rectifier module and a direct current output of the energy storage apparatus.

16. The power supply and distribution system for a data center according to claim 15, wherein each of the plurality of areas is further configured with an isolation apparatus configured to isolate the IT load and the SST power supply system located in a same area.

17. The power supply and distribution system for a data center according to claim 15, wherein the SST power supply system in each of the plurality of areas obtains a distributed alternating current through a medium-voltage bus, each of the plurality of areas is further configured with a medium-voltage switchgear, and the medium-voltage switchgear is configured to control alternating current transmission between the SST supply system and the medium-voltage bus located in a same area.

* * * * *